(12) United States Patent
Pillarisetty et al.

(10) Patent No.: US 11,222,024 B2
(45) Date of Patent: Jan. 11, 2022

(54) SYSTEMS AND METHODS FOR A REACTIVE ATTRIBUTE MANAGEMENT PLATFORM

(71) Applicant: Walmart Apollo, LLC, Bentonville, AR (US)

(72) Inventors: Bala Srinivas Pillarisetty, Milpitas, CA (US); Vijay Kumar Miriyala, Cupertino, CA (US); Zuzar F. Nafar, Mountain View, CA (US); Rohini Satheesh Bharadwaj, Santa Clara, CA (US); Siddarth Vasant Gaonkar, Union City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 356 days.

(21) Appl. No.: 16/534,005

(22) Filed: Aug. 7, 2019

(65) Prior Publication Data

US 2021/0042313 A1    Feb. 11, 2021

(51) Int. Cl.
*G06F 16/2455* (2019.01)
*G06F 16/248* (2019.01)
*G06Q 30/06* (2012.01)
*G06N 5/02* (2006.01)
*G06F 16/28* (2019.01)

(52) U.S. Cl.
CPC ...... *G06F 16/24564* (2019.01); *G06F 16/248* (2019.01); *G06F 16/285* (2019.01); *G06N 5/027* (2013.01); *G06Q 30/0603* (2013.01)

(58) Field of Classification Search
CPC ................................................. G06F 16/24564
See application file for complete search history.

(56) References Cited

U.S. PATENT DOCUMENTS

2004/0024888 A1    2/2004  Davis et al.
2004/0225541 A1   11/2004  Porter et al.
2012/0296767 A1*  11/2012  Baran .................... G06Q 30/06
                                                       705/26.7

* cited by examiner

*Primary Examiner* — Van H Oberly
(74) *Attorney, Agent, or Firm* — Bryan Cave Leighton Paisner LLP

(57) ABSTRACT

A system receives, from a content source, product information that can comprise core product data for the product and a product identification for the product. The one or more derived attributes that can be based at least on a respective use case of one or more uses cases that affects the one or more products presented in a content catalog. The content feed can merge the at least one of the one or more derived attributes with the product information to update the product information in the content feed based on matching the product identification for the product with the one or more derived attributes. Other embodiments are disclosed.

20 Claims, 9 Drawing Sheets

SYSTEMS AND METHODS FOR A REACTIVE ATTRIBUTE MANAGEMENT PLATFORM

TECHNICAL FIELD

This disclosure relates generally relates to an automatic reactive attribute management platform.

BACKGROUND

Conventional processes of updating and indexing products in catalogs can be contingent on rule change events. Such processes can be time consuming due to the complexity of computer-processes searching an entire catalog for products that can be impacted each time a rule change event is processed.

BRIEF DESCRIPTION OF THE DRAWINGS

To facilitate further description of the embodiments, the following drawings are provided in which.

Figure 1:
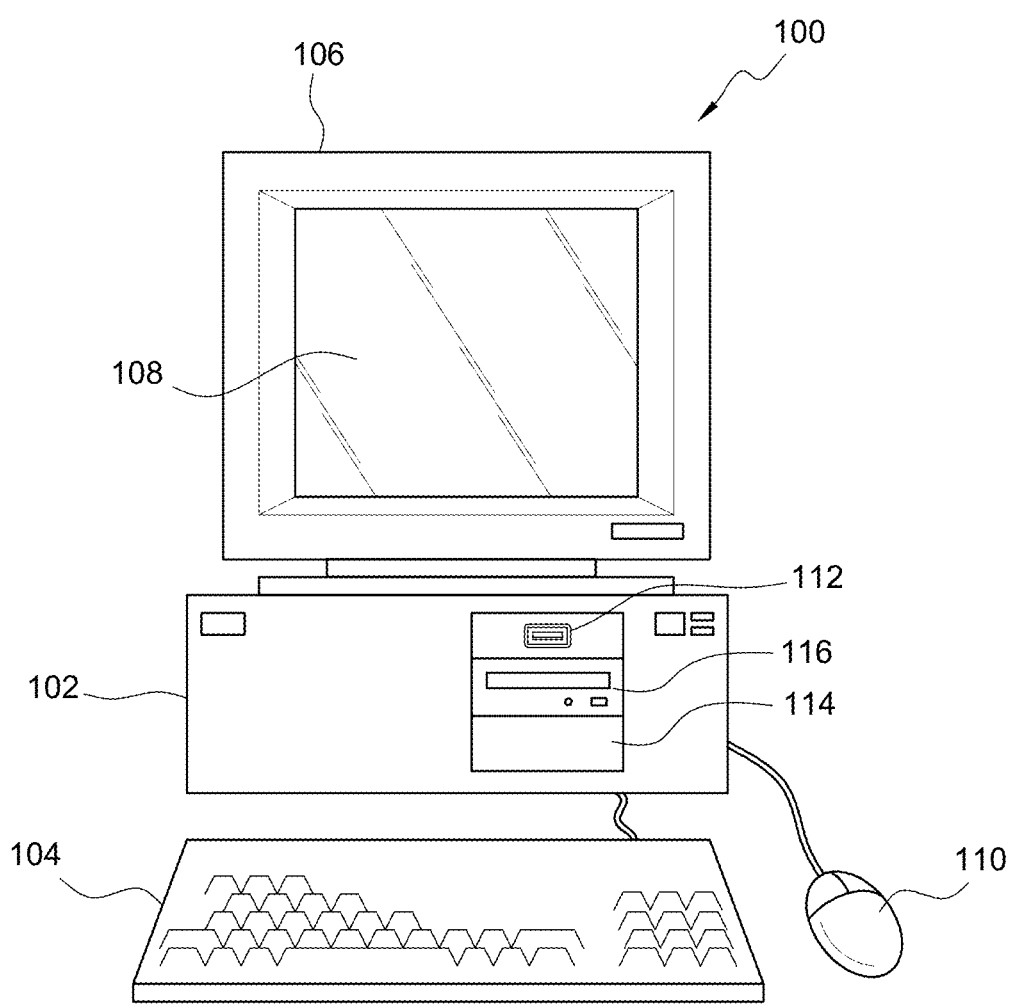
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

A new platform model capable of reacting to each new rule change event for a product in a catalog can be faster and more efficiently processed in real time. Such a platform can be external to a main pipeline that continually adds product information for products presented in a catalog. Such a platform can be called an automatic reactive attribute management platform.

Figure 2:
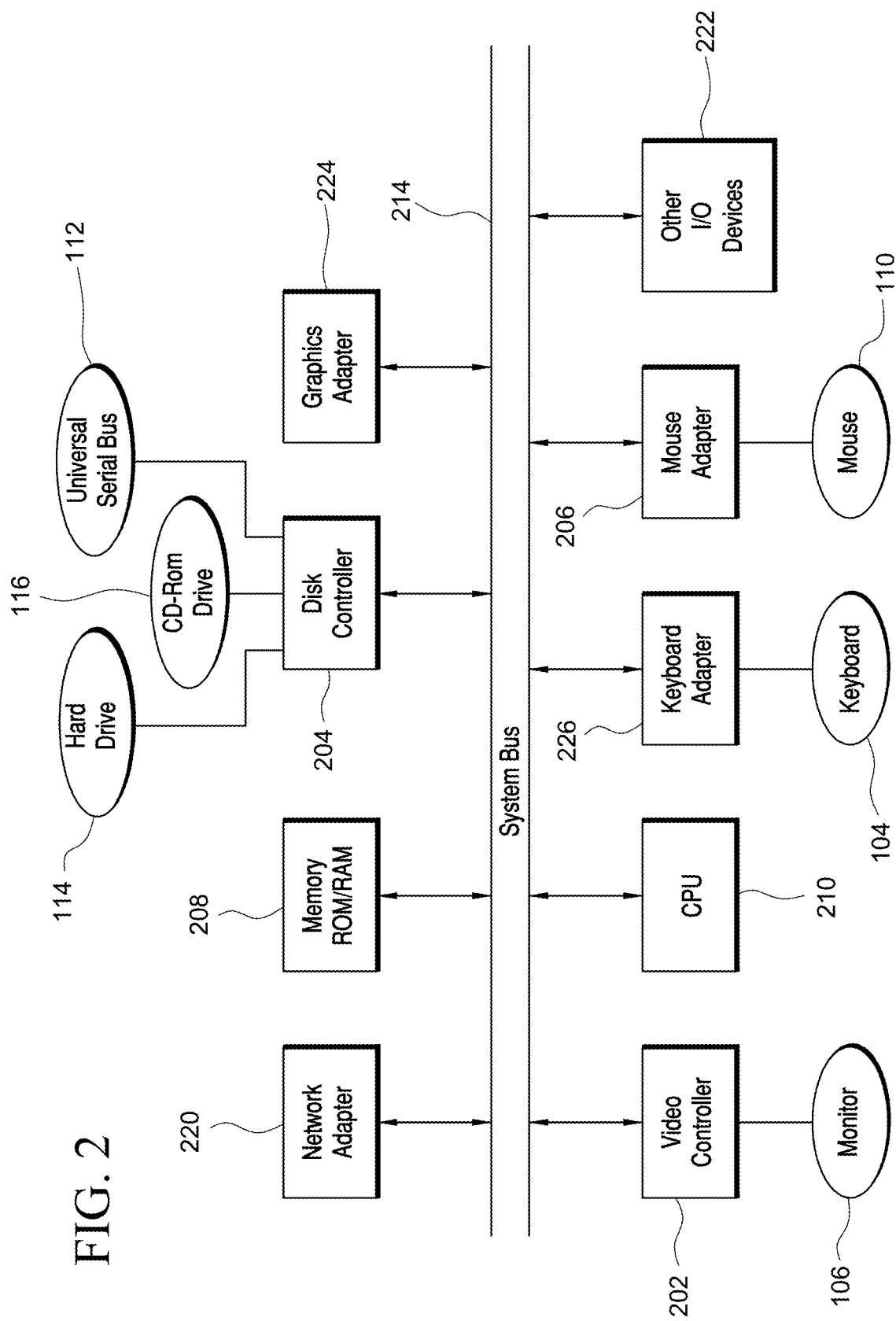
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
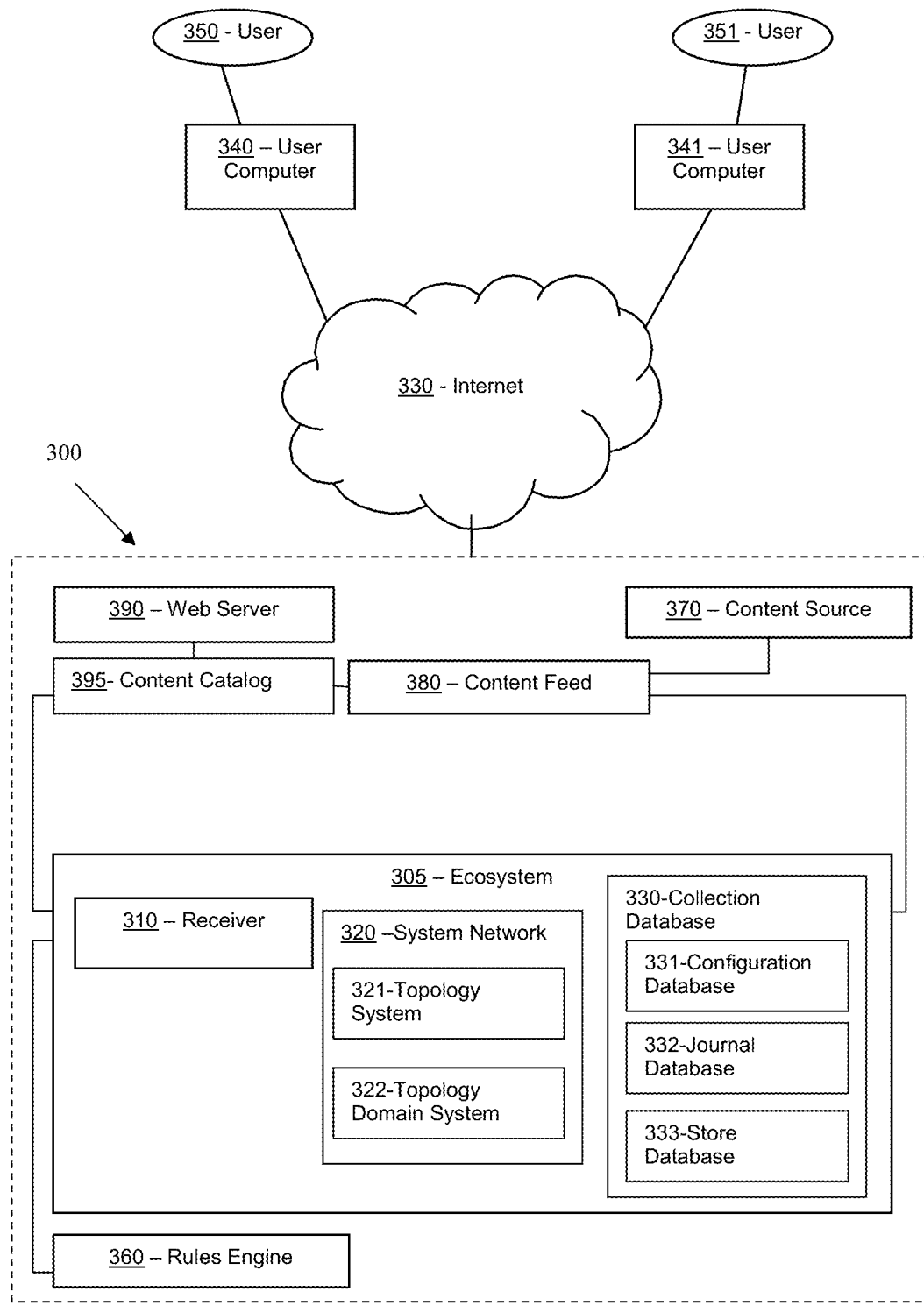
FIG. 3 illustrates a block diagram of a system that can be employed for an automatic reactive attribute management platform for a product, according to an embodiment.

Turning ahead in the drawings, FIG. 3 illustrates a block diagram of a system 300, according to an embodiment, that can be employed for automatically determining a rule change event, using a reactive attribute management platform, that can affect certain attributes of a product for display as expressed in a content catalog. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include an ecosystem 305, a rules engine 360, a content source 370, a content feed 380, a webserver 390 and/or content catalog 395. Ecosystem 305, rules engine 360, content source 370, content feed 380, webserver 390 and/or content catalog 395 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, ecosystem 305, rules engine 360, content source 370, content feed 380, webserver 390 and/or content catalog 395. Additional details regarding ecosystem 305, rules engine 360, content source 370, content feed 380, webserver 390 and/or content catalog 395 are described herein.

In a number of embodiments, each of ecosystem 305, content source 370, and/or content feed 380 can be a special-purpose computer programed specifically to perform specific functions not associated with a general-purpose computer. In many embodiments, content source 370 can be a network of content delivery computers. Similarly, in several embodiments, content feed 380 can be a network of application computers.

In some embodiments, content source 370 can be a special-purpose computer programmed to perform specific functions and/or applications, such as, receiving product information comprising core product attributes and/or core product application code including JavaScript bundles (e.g., code) of one or more webpages that can make up an entire website for a retailer (e.g., virtual retailer, on-line retailer, physical store), and storing the product information in a memory (e.g., cache memory) of the special-purpose computer system. In several embodiments, content source 370 can be a special-purpose computer programmed to perform specific functions and/or applications, such as, receiving application code including JavaScript bundles (e.g., code) of one or more webpages that can make up an entire website for a retailer (e.g., virtual retailer, on-line retailer, physical store), and storing the application code in a memory (e.g., cache memory) of the special-purpose computer system. In some embodiments, content source 370 can be a special-purpose computer programmed to perform specific functions and/or applications, such as assigning a unique product identification to each product that is received in content source 370.

In several embodiments, content source 370 can be a special-purpose computer programmed to perform specific functions and/or applications, such as, storing application code (e.g., Hypertext Markup Language code, "HTML code") including JavaScript bundles for each one of the multiple product attributes (e.g., product type, brand, color) and/or multiple webpages that can make up a website. In many embodiments, content source 370 can be a content delivery network where one or more content delivery computers can be in data communication with one another and vice-versa.

Figure 6:
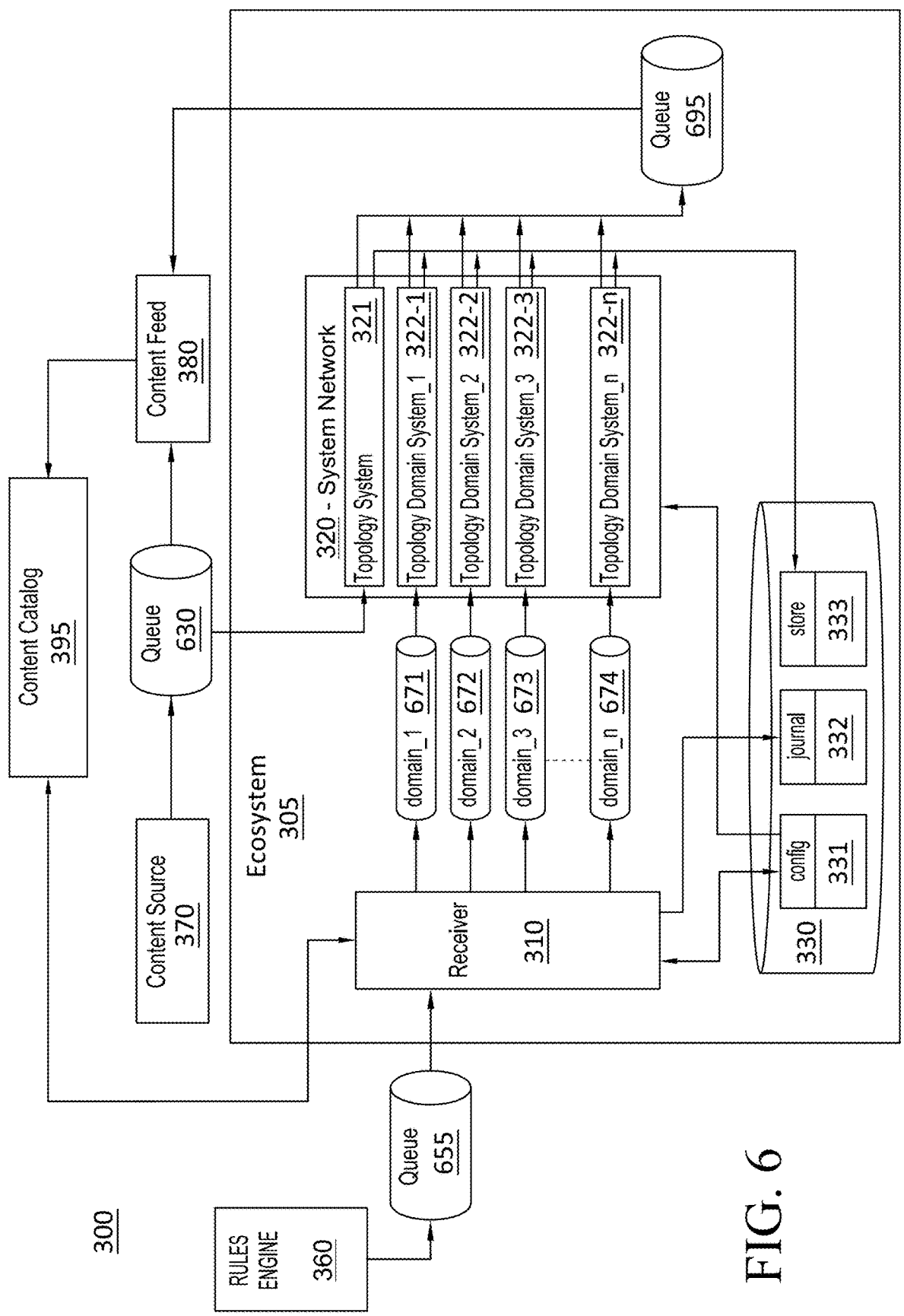
FIG. 6 illustrates a flow chart diagram for a system according to another embodiment of FIG. 3.

In some embodiments, content feed 380 can be a special-purpose computer programmed to perform specific functions and/or applications, such as, receiving one or more derived attributes and/or derived attribute values from a database, such as store database 333, linked to a unique product identification of a product to implant and/or merge the derived attributes and/or derived attribute values to the product data. In many embodiments, content feed 380 can be a special-purpose computer programmed to perform specific functions and/or applications, such as, receiving one or more derived attributes and/or derived attribute values from a database for a qualifying product and/or qualifying product identification, such as store database 333, as further described in topology systems, such as topology domain system_1 322-1, topology domain system_2 322-2, topology domain system_3 322-3 and/or topology domain system_n 322-*n* (FIG. 6).

In some embodiments, content feed 380 can be a special-purpose computer programmed to perform specific functions and/or applications, such as, modifying and/or updating a catalog, such as content catalog 395, with the product information that can include additional derived attributes and/or derived attribute values.

In some embodiments, ecosystem 305, rules engine 360, content source 370, content feed 380, webserver 390 and/or content catalog 395 can be in data communication with each other or vice versa. Ecosystem 305, rules engine 360, content source 370, content feed 380, webserver 390 and/or content catalog 395 can be in data communication through Internet 330 with one or more user computers, such as user computers 340 and/or 341. Internet 330 an be a public or private network. In some embodiments, user computers 340-341 can be used by users, such as users 350 and 351, which also can be referred to as customers and/or third-party vendors (e.g., sellers, manufacturers), in which case, user computers 340 and 341 can be referred to as customer computers and/or third-party vendor computers (e.g., seller computers). In many embodiments, web server 305 can host one or more websites. Ecosystem 305, rules engine 360, content source 370, content feed 380, webserver 390 and/or content catalog 395 can host a website that allows users to browse and/or search for items (e.g., products), such as in content catalog 395, and/or to add product information for items (e.g., products) to a multi-channel content network system, such as content source 370, in addition to other suitable activities.

In some embodiments, an internal network that is not open to the public can be used for communications between ecosystem 305, rules engine 360, content source 370, content feed 380, webserver 390 and/or content catalog 395 within system 300. Accordingly, in some embodiments, ecosystem 305, content source 370, content feed 380, and/or content catalog 395 (and/or the software used by such systems) can refer to a back end of system 300, which can be operated by an operator and/or administrator of system 300, and content source 370 and/or webserver 390 (and/or the software used by such systems) can refer to a front end of system 300, and can be accessed and/or used by one or more users, such as users 350-351, which can also be referred to as third-party vendors (e.g., sellers, manufacturers), using user computers 340-341, which can also be referred to as third-party vendor computers (e.g., seller computers), respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341, which, as indicated above, can also be referred to as customer computers and/or third-party vendor computers (e.g., seller computers), can be desktop computers, laptop computers, a mobile device, and/or other endpoint devices used by one or more users 350 and 351, which can also be referred to as third-party vendors (e.g., sellers, manufacturers), respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, ecosystem 305, rules engine 360, content source 370, content feed 380, webserver 390 and/or content catalog 395 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to ecosystem 305, rules engine 360, content source 370, content feed 380, webserver 390 and/or content catalog 395, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of ecosystem 305, rules engine 360, content source 370, content feed 380, webserver 390 and/or content catalog 395. In a similar manner, the processors and/or the non-transitory computer-readable media can be local and/or remote to each other.

Meanwhile, in many embodiments, ecosystem 305, rules engine 360, content source 370, content feed 380, webserver 390 and/or content catalog 395 also can be configured to communicate with and/or include one or more databases and/or other suitable databases. In some embodiments, ecosystem 305, and/or content feed 380, also can be configured to communicate with and/or include one or more databases, such as collection database 330. In several embodiments, ecosystem 305, and/or content feed 380, also can be configured to communicate with and/or include collection database 330, which can include a configuration database 331, a journal database 332, and/or store database 333. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between ecosystem 305, rules engine 360, content source 370, content feed 380, webserver 390 and/or content catalog 395, and/or the one or more databases, such as collection database 330, configuration database 331, journal database 332, and/or store database 333, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments users (e.g., 350-351), such as third-party vendors (e.g., sellers, manufacturers), can often produce and/or generate new products, create improvements to products, modify a product attribute (e.g., product type, brand, color), modify core product data, add an expansion to a product line, and/or add an expansion of a product attribute, in addition to other suitable activities. When such new and/or modified information becomes available, users, such as third-party vendors, can send and/or download the new and/or modified product information to a multi-channel content network system, such as content source 370, via webserver 390 and internet 330, and using user computers (e.g., 340-341). In many embodiments, the users, such as third-party vendors, can use an Application Programming Interface (API) to communicate and/or transmit code to one or more applications of the multi-channel content network system, such as content source 370.

In many embodiments, ecosystem 305 can include various systems and/or components. Ecosystem 305 is merely exemplary and is not limited to the embodiments presented herein. Ecosystem 305 can be employed in many different embodiments or examples not specifically depicted or described herein. In some embodiments, certain elements or system of ecosystem 305 can perform various procedures, processes, and/or acts. In other embodiments, the procedures, processes, and/or acts can be performed by other suitable elements or systems. In many embodiments, the systems of ecosystem 305 can be modules of computing instructions (e.g., software modules) stored at non-transitory computer readable media that operate on one or more processors. In other embodiments, the systems of ecosystem 305 can be implemented in hardware. In many embodiments, ecosystem 305 can include a receiver 310, a system network 320, and/or a collection database 330.

In several embodiments, receiver 310 can receive an old rule and a new rule for the same product and/or item from a rules engine, such as rules engine 360. In some embodiments, receiver 310 can receive one or more rules from rules engine 360 that can impact and/or modify an existing rule that can lead to a new rule and/or a superset of an existing rule to be expressed and/or implemented on more than one qualifying product and/or qualifying product identification (e.g., product and/or product identification.) In a number of embodiments, receiver 310 can process one or more derived attribute values based on one or more rules from rules engine 360 can impact and/or modify an existing rule and/or rule expression (e.g., attribute=value) located on more than one qualifying product and/or qualifying product identification, where a qualifying product and/or qualifying product identification can be a product and/or product identification associated with a derived attribute value, as discussed below in greater detail in activity 407 (FIG. 4) and FIG. 8. In several embodiments, receiver 310 can perform a search for qualifying products and/or qualifying product identifications using a search engine and/or by scanning a content catalog, such as content catalog 395. In many embodiments, receiver 310 can receive only a new rule for one or more products when an old rule does not exist for the one or more products. For example, a rule can include a rule to update a product attribute (e.g., product type, brand, color), delete a product attribute, or expand the scope of a product attribute to include additional related product attributes, as described in greater detail below. In many embodiments, system receiver 310 can operate within ecosystem 305, where rules engine 360 can operate outside of ecosystem 305.

In many embodiments, receiver 310 can receive one or more rules from rules engine 360 that can apply to more than one or more products and/or product categories. In several embodiments, each product receives a unique product identification when it is received and/or processed through a multi-channel content network system, such as content source 370. In some embodiments, each product received from content source 370 can include core product data that can be transmitted to content source 370 by users, such as users 350-351. In various embodiments, a rule can apply to more than one product identification of the one or more products. For example, an old rule can include a derived attribute value, such as shoes for a product category, and a new rule related to the old rule and for the same product as the old rule can include a derived attribute value, such as shoes and sandals for a product category, wherein the rule change can be to include sandals for the product category. Further, such a rule impact can lead to an update in the content catalog for all of those products and/or product identifications that have the old rule of shoes as the product category and the impact of the new rule can expand and/or increase the old product category from shoes to both shoes and sandals. In several embodiments, the rules can be tailored to one or more product attributes that can be associated with a product identification of a product and/or item that can be included in a multi-channel content index, such as content catalog 395. In a number of embodiments, the rules can be implemented in a rules engine, such as rules engine 360.

Product Attributes and Derived Attributes

In a number of embodiments, a product attribute can be an attribute used to describe one or more aspects and/or characteristics of a product, such as, a product type, a brand, a color. In several embodiments, a derived attribute can be based on a rule and/or a rule change event. In some embodiments, a rule change event can derive and/or affect the presentation and/or display of a product and/or product identification received by a seller (e.g., retailer) in a content catalog, such as content catalog 395. In many embodiments, a derived attribute can include derived attribute values that can be a descriptor and/or characteristic that can be derived from a rule change event, such as a rule definition, a command to activate a rule, and/or changing and/or modifying a derived attribute value already assigned to a qualifying product and/or qualifying product identification (e.g., product and/or product identification.) In several embodiments, while a product attribute can describe a product, a derived attribute and a corresponding derived attribute value can determine how the product can be displayed, categorized, and/or presented on a webpage and/or website for a pre-determined period of time (e.g., seasonality, discounts, top-seller) as determined by a seller (e.g., retailer). For example, a derived attribute value for a product can include a "shelf," where the "shelf" is a term that can indicate a placement and/or order of the product data as displayed on a particular webpage and/or at a particular location on the webpage, among other suitable activities associated with the derived attribute value, such as "shelf" In several embodiments, product data, such as core product data, can include one or more product attributes and/or product descriptors that also can describe one or more aspects and/or characteristics of a product. In some embodiments, product data can include both core product data and derived attributes and/or derived attribute values that can be displayed in a specific manner in a content catalog, such as content catalog 395, as well as other suitable activities related to using product data of a product.

In a number of embodiments, a derived attribute can be part of a reporting hierarchy tree, such as the simplified example of a reporting hierarchy tree diagram illustrated in FIG. 9 below. In some embodiments, a derived attribute can be associated with a reporting hierarchy tree where products and/or items can be assigned to leaf nodes of the reporting hierarchy tree and the leaf nodes can be assigned a reporting hierarchy identification number ("RHID"), such as R2D2, whereas R2D2 can be used in several simplified examples below to represent such a derived attribute for a product.

Figure 4:
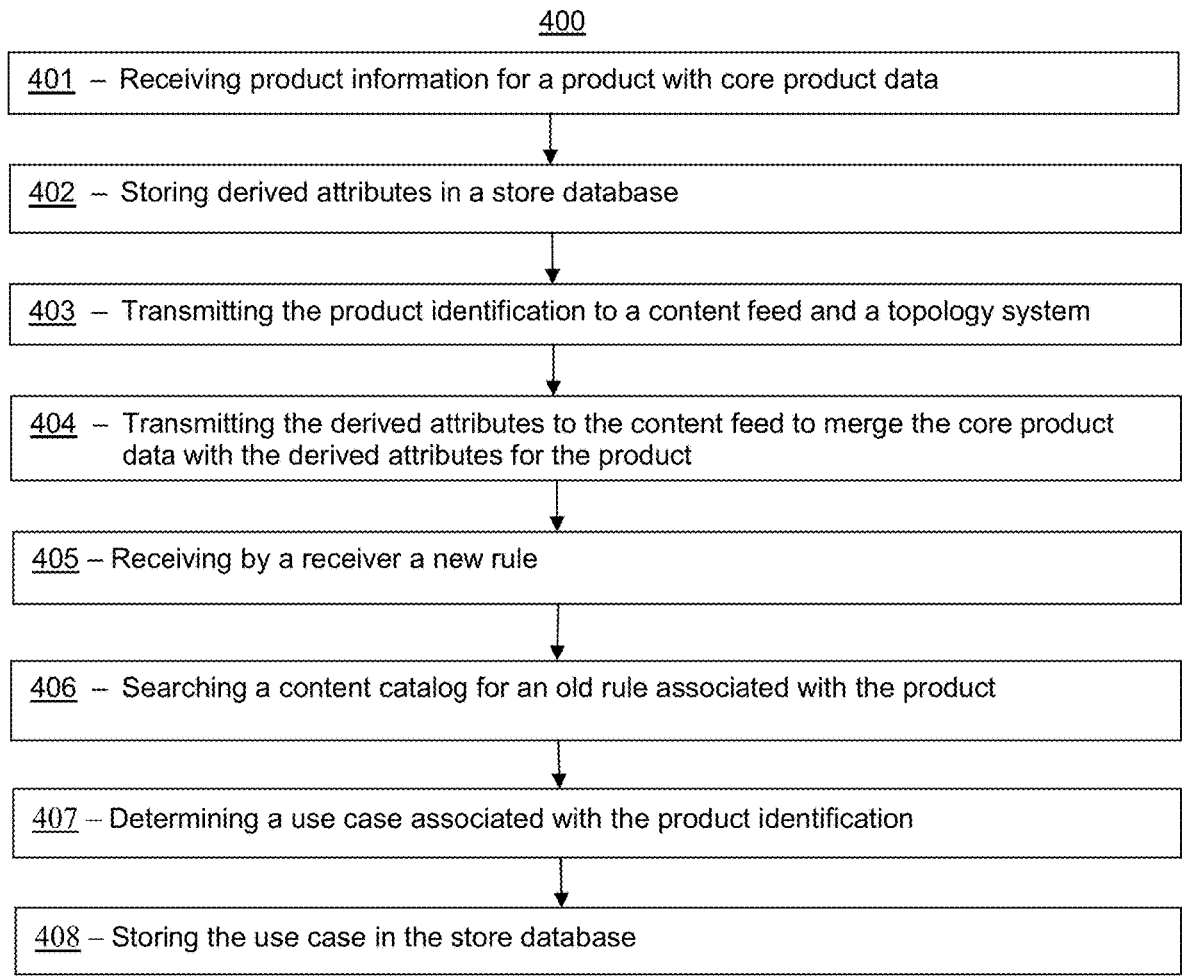
FIG. 4 illustrates a flow chart for a method, according to another embodiment.

In many embodiments, receiver 310 can search content catalog 395 for products and/or product identifications that can "qualify" and/or match a rule expression defined on a derived attribute value. In several embodiments, receiver 310 can determine from the new rule and old rule which derived attribute value and corresponding rule expressions can require an ADD event and/or a DELETE event based on the rule change event and use cases, as described below in greater detail in activity 407 (FIG. 4). In some embodiments, a search result of a content catalog can result in a population of "qualifying products" that can be impacted by a rule change event, where an ADD event and/or a DELETE event will be applied to each qualifying product in the population.

In a number of embodiments, receiver 310 can determine the derived attribute value and the rule expression that should be added, deleted, and/or updated in the population and/or search results for the qualifying products. As an example, a number of qualifying products can include approximately a few products, a few thousand, a few million and/or more qualifying products that can match a single derived attribute value and corresponding rule expression and/or rule expressions based on a rule change event.

In several embodiments, an example of a derived attribute for a product (e.g., qualifying product) can be named R2D2. In some embodiments, an example of a derived attribute, such as R2D2, can include a derived attribute value, such as R2D21. In many embodiments, an example of derived attribute value can include an old and/or existing set of rules expressions, such as:

RE3: {product type=shoes} 0.2, where RE3: is a rule, {product type=shoes} is a rule expression (e.g., attribute=value), and 0.2 is a weight of the rule that can be used to measure a "wining value" of all the derived attribute values assigned to the product in a members list, described below in greater detail in activity 407 (FIG. 4.) Following the example in the previous paragraph, a new rule and/or new rule expression for derived attribute R2D2 that can match the old rule can include, as an example, RE3: {product type=shoes, sandals} 0.25. In several embodiments, receiver 310 can create a use case by locating an old and/or existing old rule, wherein the old rule minus a new rule can result in at least five use cases, as described in greater detail below.

In several embodiments, system network 320 can include a topology system 321 and/or a topology domain system 322. In many embodiments, system network 320, topology system 321, and/or topology domain system 322 can operate within ecosystem 305. In some embodiments, topology system 321 can receive a copy of the product data tagged (i.e., attached) with a unique product identification, and can perform a search of a database, such as store database 333, for one or more derived attribute values that can match the product identification of the product. In some embodiments, topology system 321 can receive product data (e.g., core product data) tagged (i.e., attached) with a unique product identification, and can perform a search of a database, such as store database 333 for one or more derived attribute values that match the product identification of the product. In many embodiments, when topology system 321 locates one or more derived attribute values that match the product identification of the product, topology system 321 can send the one or more derived attributes to a queue, such as queue 695 (FIG. 6). In several embodiments, a queue, such a queue 695 (FIG. 6), can hold one or more derived attributes and attribute values for a pre-determined retention period of time prior to sending all of the derived attributes stored in the queue to a multi-channel content system, such as content feed 380.

In several embodiments, when topology system 321 locates one or more derived attributes and/or derived attribute values that match the product identification of the product, topology system 321 can send the one or more derived attributes and/or derived attribute values directly to a multi-channel content system, such as content feed 380. In a number of embodiments, topology system 321 can include winning values from among the one or more derived attribute value that can indicate the qualifying product and/or qualifying product identification of the product can be updated in a multi-channel content system, such as content feed 380.

In many embodiments, topology domain system 322 can receive one or more use cases that are linked and/or matched to a product identification of a product based on a rule event. In some embodiments, topology domain system 322 can include topology domain systems 322-1, 322-2, 322-3, and 322-n, described below in greater detail in FIG. 6. In several embodiments, topology domain system 322 can collect one or more use cases for each product identification by creating a separate topology domain for each product identification, such as topology domain systems 322-1, 322-2, 322-3, and 322-n, described below in greater detail in FIGS. 3 and 6. In some embodiments, topology domain system 322 can aggregate and/or collect all of the use cases that can be linked and/or matched to a product and/or product identification for a predetermined retention period of time prior to sending all of the collective use case information to a database for storage, such as store database 333.

In many embodiments, collection database 330, can include one or more other databases, such as configuration database 331, journal database 332, and/or store database 333. In several embodiments, configure database 331 can store the data configurations received from receiver 310. In many embodiments, configure database 331 can send and/or transmit the data configurations by interacting with receiver 310. In some embodiments, configure database 331 can be in data communication with receiver 310 to receive and/or transmit data configurations. In a number of embodiments, data configurations stored and/or accessed in configuration database 331, can include a rule change event and/or use cases. In a number of embodiments, configure database 331 can receive and/or send the data configurations to system network 320 and vice versa.

In some embodiments, journal database 332 can track and store the status of each rule change event and/or use case, received by rules engine 360, and processed by receiver 310 into commands and/or instructions to add, delete, and/or update derived attribute values for qualifying products and/or qualifying product identifications.

Turning ahead in the drawings, FIG. 4 illustrates a flow chart for a method 400. In some embodiments, method 400 can be a method of automatically determining a rule change event that can affect certain attribute values for a given product that can be displayed, cataloged, and/or presented in a specified format, among other suitable activities, in a content catalog when using a reactive attribute management platform. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, ecosystem 305 (FIGS. 3 and 6) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as ecosystem 305 (FIG. 3).

The processor(s) can be similar or identical to the processor(s) described above with respect to computer system 100 (FIG. 1).

In some embodiments, method 400 and other activities in method 400 can include using a distributed network including distributed memory architecture to perform the associated activity. One of the advantages of this distributed architecture can be shown by reducing the impact on the network and system resources to reduce congestion in bottlenecks by using a reactive attribute management platform while still allowing data to be accessible from a central location.

Referring to FIG. 4, method 400 can include an activity 401 of receiving, from a content source, product information for a product of one or more products, such that the product information comprises core product data for the product and a product identification for the product. In some embodiments, activity 401 can include receiving, from the content source, the product information for the product from one or more third-party sources. The content source can be similar or identical to content source 370 (FIG. 3).

Figure 5:
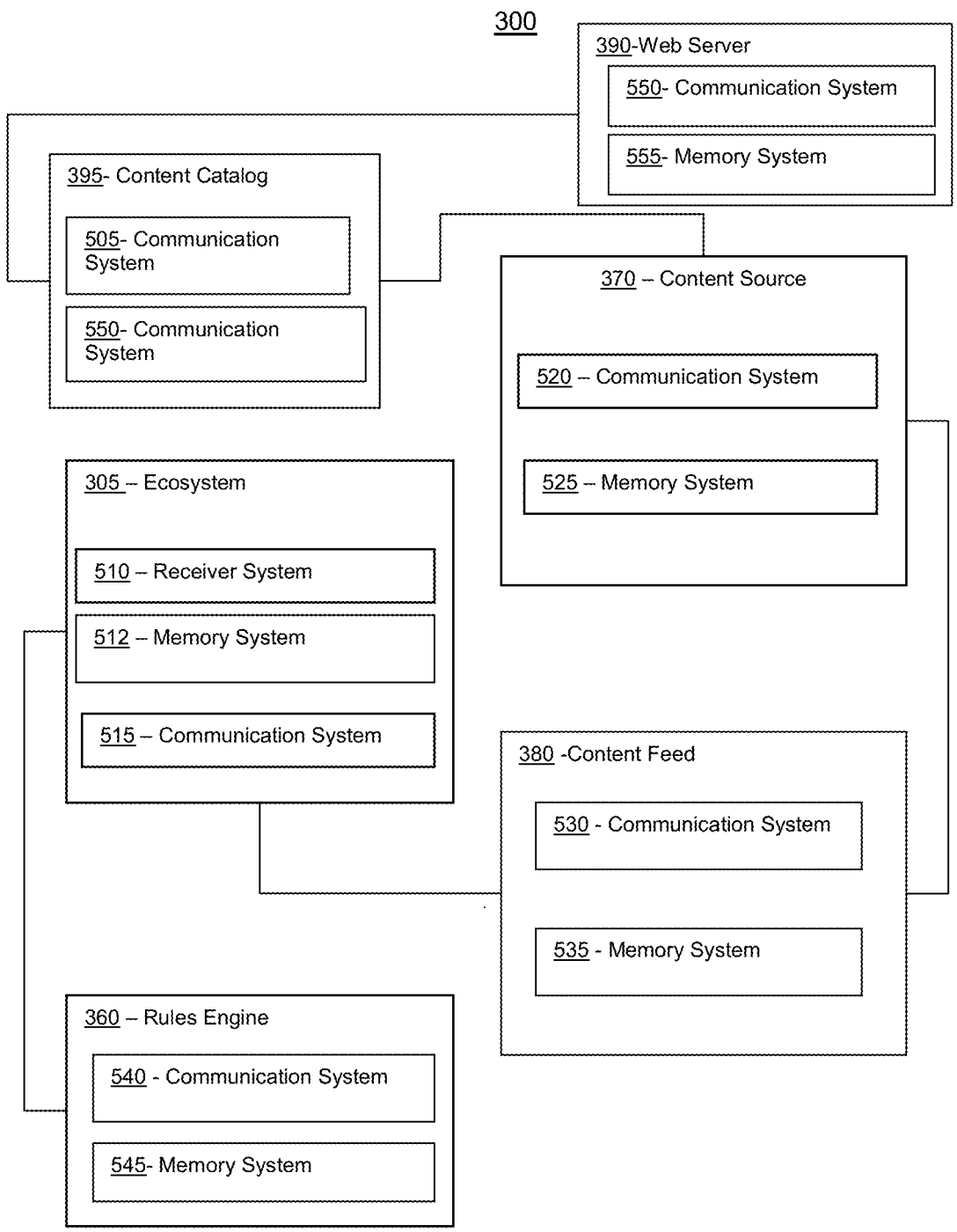
FIG. 5 illustrates a representative block diagram for an automatic reactive attribute management platform for a product, according to the embodiment of FIG. 3.

In several embodiments, method 400 also can include an activity 402 of storing, in a store database, one or more derived attributes of the one or more products. In many embodiments, activity 402 of storing, in a store database, one or more derived attribute values of the one or more products. In some embodiments of activity 402, the one or more derived attributes can be based at least on a respective use case of one or more use cases that can affect the one or more products as presented in a content catalog, and at least one of the one or more derived attributes affects at least the product of the one or more products. In several embodiments, activity 402 also can include matching the one or more derived attributes with more than one of one or more product identifications of the one or more products, where the one or more product identifications are received from the content source, and where the one or more product identifications comprise the product identification. In some embodiments, activity 402 also can include sending, from one or more topology domain systems to the store database for storage in the store database, the one or more derived attributes and/or derived attribute values in reaction to a rule change event received by a receiver, such as receiver 310 (FIGS. 3 and 6). In many embodiments, activity 402 can be implemented as shown in FIG. 5 and as further described below. The store database of activity 402 can be similar or identical to store database 333 (FIGS. 3 and 6), and the topology domain systems of activity 402 can be similar or identical topology domain system 322 (FIGS. 3 and 6).

In a number of embodiments, method 400 additionally can include an activity 403 of transmitting, to a content feed and a topology system 321 (FIGS. 3 and 6), the product identification for the product. In some embodiments, activity 403 can include transmitting, to the content feed, the core product data for the product. The content feed can be similar or identical to content feed 380 (FIGS. 3 and 6.) In the same or different embodiments, after transmitting the product identification of the product to the topology system in activity 403, method 400 can include searching store database 333 (FIGS. 3 and 6), via the topology system, for the one or more derived attributes that match the product identification, such that transmitting, to the topology system, the product identification of the product in activity 403 further comprises transmitting, to the content feed, the one or more derived attributes that match the product identification. In many embodiments, activity 403 can be implemented as shown in FIG. 5 and described below. The topology system of activity 403 in FIG. 4 can be similar or identical to topology system 321 (FIGS. 3 and 6), and the content feed of activity 403 in FIG. 4 can be similar or identical to content feed 380 (FIGS. 3 and 6).

In several embodiments, method 400 further can include an activity 404 of transmitting, to the content feed, the one or more derived attributes. The content feed can merge the at least one of the one or more derived attributes with the product information to update the product information in the content feed based on matching the product identification for the product with the one or more derived attributes. This merging process can occur as part of activity 404 or as a separate activity. In either situation, the product information, after the merging process, can comprise the core product data, the product identification, and the at least one of the one or more derived attributes. In many embodiments, activity 404 can be implemented as shown in FIG. 5 and described below.

In a number of embodiments, method 400 additionally can include an activity 405 of receiving, by a receiver and from a rules engine, a new rule and an old rule, when an old rule exists, that can affect the product. In several embodiments of method 400, the new rule (e.g., old rule minus new rule) that can affect the product can comprise a deletion of the old rule associated with the product identification of the product, and the old rule can be deleted by removing derived attribute values of the product (e.g., members list) prior to the new rule and corresponding derived attribute value being added to the product information of the product (e.g., members list.) The receiver can be similar or identical to receiver 310 (FIGS. 3 and 6). Additionally, the rules engine can be similar or identical to rules engine 360 (FIGS. 3 and 6).

In several embodiments, method 400 further can include an activity 406 of searching, by the receiver, the content catalog for the product identification for the product that matches the new rule and/or use case based on a rule change event. In many embodiments activity 406 can also include using a search engine to search for one or more product identifications associated with the new rule and/or use case based on a rule change event received by the rules engine. In some embodiments, an old rule can be associated with one or more product identifications of the one or more products in the content catalog. In many embodiments, activity 406 can be implemented as shown in FIG. 5 and described below. The content catalog can be similar or identical to content catalog 395 (FIGS. 3 and 6).

Use Cases

In a number of embodiments, method 400 additionally can include an activity 407 of determining, by the receiver, a first use case of one or more use cases based on an old rule minus a new rule. In some embodiments, the first use case can be based on a derived attribute value of a derived attribute with a rule and corresponding rule expressions that can be matched with one or more qualifying products and/or qualifying product identifications (e.g., Item_Id). In several embodiments, activity 407 can include assigning a derived attribute value, based on a first use case, a "weight" to determine a hierarchy level and/or value of a derived attribute and corresponding rule. In several embodiments, activity 407 can include receiving a new rule and an old rule from a rules engine, such as rules engine 360 (FIGS. 3 and 6.) In many embodiments, activity 407 can be implemented as shown in FIG. 5, as further described below.

In several embodiments, activity 407, of creating and/or activating rule change events can include an ADD event and/or ADD flow, a DELETE event and/or DELETE flow, and/or an UPDATE event and/or UPDATE flow that can be activated to affect certain product information of one or more products dependent on the commands and/or instructions received from a rule change event. In some embodiments, a qualifying product and/or qualifying product identification can include a members list where a member (e.g., rule and corresponding rule expression) can be a derived attribute value listed in the members list. In various embodiments, a qualifying product and/or qualifying product identification can have a member that contains an old rule and corresponding old rule expression that can be affected by a rule change event such as a new rule. In a number of embodiments, the rule change event can add, delete, and/or update the rule and corresponding rule expressions currently existing and stored in members list for each qualifying product. In many embodiments, a DELETE event can be performed when an existing rule expression can be changed and/or modified to include fewer rule expressions. In some embodiments, a DELETE event can occur in some use cases, such as use case three, use case four, and use case five, as discussed in greater detail below and in FIG. 8.

In several embodiments, an ADD event can be performed when a new rule can be defined using a derived attribute value and/or an existing rule expression and the new rule can be changed to include more rule expressions than the current and/or existing old rule (e.g., Rold). In many embodiments an ADD event can occur in all five use cases dependent on the commands and/or instructions associated with the derived attribute value based on rule changes and/or rule change events. In several embodiments, a DELETE event and an ADD event combined as part of a command and/or instruction from a derived attribute value and corresponding rule and rule expressions can create an UPDATE event where a current and/or existing old rule is deleted and the new rule is added to the old rule and/or where part of a current and/or existing old rule is deleted and the new rule is added to the remaining part of the old rule.

As a simplified example of an ADD event, when a new rule expression was added to the old rule as part of a rule change event, example rule expressions can appear as follows:
EXP 1: product type is "Laptop Computers"
EXP 2: brand is "Dell"
EXP 3: laptop type is "2 in 1 Laptop"
Where EXP 1 can be an existing rule expression, EXP 2 can be an existing rule expression, and EXP 3 can be the added rule expression of the ADD event when a new rule expression was added to the old rule.

In another simplified example of a DELETE event, when a rule expression was deleted as part of a rule change event, example rule expressions can appear as follows:
EXP 1: product type is "Laptop Computers"
EXP 2: brand is "Dell"
EXP 3: laptop type is "2 in 1 Laptop"
Where EXP 1 can be an rule existing rule expression, EXP 2 can be a deleted rule expression, and EXP 3 can be a deleted rule expression of the DELETE event when more than one rule expressions were deleted.

As another simplified example of an UPDATE event, when an existing rule expression was updated as part of this rule change event, example rule expressions can appear as follows:
EXP 1: product type is "Laptop Computers"
EXP 2: brand is "Dell" or brand is "HP"
Where EXP 1 can be an existing rule expression, and EXP 2 can be a updated rule expression by adding "or brand is 'HP'" where an existing rule expression, such as "brand is 'Dell'" can be updated.

Returning to FIG. 4, in several embodiments, activity 407 can create one or more use cases based on an old rule (Rold) minus a new rule (Rnew) that can result in various changes, modifications, and/or impacts for any and/or all of one or more products and/or product identifications (e.g., qualifying product) that have a same derived attribute value. In many embodiments, rules engine 360 (FIGS. 3 and 6) can include can rules and/or rule change events, such as partially deleting an old rule (Rold) by creating an expanded new rule (Rnew), and/or having two sets of rules, Rold and Rnew, among other suitable activities of use cases. In many embodiments, activity 407 can be further described below in FIGS. 7 and 8.

Turning back to FIG. 4, in many embodiments a catalog, such as content catalog 395 (FIGS. 3 and 6) can include product information for approximately more than ten million (10,000,000) products at any given time of a day, a week, or other suitable period of time. In a number of embodiments, a content catalog, can be an online content catalog that supplies and/or stores a mix of product information, derived attributes and derived attribute values for each product to be displayed, cataloged, and/or listed in a specific manner in the content catalog. In several embodiments, vendors (e.g., sellers, manufacturers) send new product information and/or update existing product information on an hourly, a daily, a weekly or other suitable period of time. In many embodiments, vendors and/or third-party sources can transmit and/or download approximately more than ten thousand (10,000) pieces of product information at any given period of time, day and/or other suitable period of time, where the product information can be updated in the content catalog by one or more separate and/or individual processes (e.g., threads).

In a number of embodiments, product information can be supplemented to include business rules, rule change events, product classifiers, among other suitable activities, grouped together as derived attributes and/or derived attribute values. In many embodiments, a group of derived attributes and/or derived attribute values can include parameters, such as shelf facets, among other parameters, that can be used in one or more commerce related activities such as sales, inventory, marketing or other suitable activities, even when the derived attribute values can have nothing to do with the product data of the product itself. As an exemplary illustration, product information from a source (e.g., third-party vendor) can be received for a product, such as a cell phone. In a simplified example of derived attribute values for a cell phone, the derived attribute values can include such activities as deriving a category for the cell phone to know where to list the cell phone in the content catalog, using metrics to define whether the cell phone can be a top seller, deriving whether the cell phone can be a seasonal item, deriving whether and/or when the cell phone can be a discountable item, as well as many other suitable activities associated with placing the cell phone at a suitable location and/or a suitable category in a content catalog, such as content catalog 395 (FIGS. 3 and 6.) Another example of a derived attribute value for the cell phone can include determining a "shelf" for the cell phone that can determine a location and/or a placement of the cell phone product on a webpage and/or a website. Another example of a derived attribute value for a product can include creating facets and facet values for the product, where users, such as users 350-351, can search a website for the product using the facets and facet values as search filters using a webserver, such as webserver 390 (FIGS. 3 and 6).

In several embodiments, product information received from a vendor (e.g., seller, manufacturer), can include core product data about the product. In some embodiments, product information can be uploaded from a source (e.g., third-party vendor) and/or listed in a content catalog, such as content catalog 395 (FIGS. 3 and 6), among other suitable activities.

According to various embodiments for method 400 (FIG. 4), the following Tables 1-4 contain simplified examples of product identifications, operators, derived attribute values, and other suitable elements, that can be applied and/or used as baseline information to define and/or explain each of the use cases based on various exemplary scenarios associated with rule change events, as is described in greater detail below.

In several embodiments for method 400 (FIG. 4), Tables 5-19, below, contain additional simplified examples of five (5) separate and/or individual use case scenarios of use cases that can illustrate various manners and/or ways in which a rule change event can affect the distribution and/or display (e.g., impact) of product information and/or product identification by adding, deleting, and/or updating derived attribute values and corresponding rules and rule expressions for display and/or presentation in a specified format and/or manner in a content catalog, such as content catalog 395 (FIGS. 3 and 6).

In many embodiments for method 400, when a new rule is defined for all products that qualify (e.g., match the rule and rule expression) for the derived attribute value, the derived attribute value and the corresponding rules and rule expressions can then be added to each member list of each of the qualifying products (e.g., Item_id), as further described in greater detail below and in FIG. 8. In several embodiments, each rule change event can be added to a member list to each one of all of the qualifying products and/or qualifying product identifications. In many embodiments, once the derived attribute values based on the rule change events have been added to the member list, commands and/or instructions derived from the rule change events, such as delete, add, and/or update can be activated (e.g., implemented) and a "winning value" (e.g., lowest weight of a derived attribute value, rule and rule expression) can be determined for each of the qualifying products. In a number of embodiments, a winning value can be determined by comparing the lowest weight of the other derived attribute values, rules and rule expressions existing and/or currently placed in the members list of a qualifying product and/or qualifying product identification, where a winning value is an indication of an update that can be implemented in a content catalog. In many embodiments, after a rule change event for a qualifying product can be activated, an existing and/or current winning value that remains in the winning value position can be changed and/or can remain in the same position. In a number of embodiments, when the winning value is changed in a members list of a derived attribute value for a qualifying product, it can be an indication that a product update for the qualifying product and/or qualifying product identification can be implemented in a content catalog.

Table 1, below, is a simplified example of several types of exemplary product attributes that can be used to describe a product and exemplary types of operators that can be used to determine a weight of a rule and rule expression associated with a derived attribute value. In many embodiments, Table 1, can be used with any and all of the exemplary use cases described below based on one or more rule change events, exemplary attributes, and exemplary operator symbols.

As an example, in Table 1, below, the left hand column titled product attributes lists examples of product attributes that could be attributed to a qualifying product, such as: an Item_id, brand, a personalization_url, a primary_shelf-id||primary_shelf, a bisac_subject_code, a sports_league, a product_type, a pch_id, a legacy_rhid, and <rest all>.

In Table 1, below, the third column titled, Operator, lists some examples of operators that could be used with the product attributes to calculate a weight of a rule expression using equation 1, described below.

TABLE 1

Exemplary lists of product attributes and operators

| Product Attributes | $W_a$ ↑ | Operator | $W_o$ ↑ |
|---|---|---|---|
| Item_id | 0 | = | 0.0 |
| brand | 1 | IN | 0.1 |
| personalization_url | 2 | BEGINS_WITH | 0.2 |
| primary_shelf_id \|\| primary_shelf | 3 | CONTAINS | 0.3 |
|  |  | NOT_EQUAL | 0.4 |
| bisac_subject_code | 4 | NOT_IN | 0.5 |
| sports_league | 5 | BLANK | 0.6 |
| product_type | 6 | NOT_BLANK | 0.7 |
| pch_id | 7 | <rest all> | 0.8 |
| legacy_rhid | 8 |  |  |
| <rest all> | 9 |  |  |
| $W_{exp} = W_a + W_o$ | | | |

Below in Table 2, is a simplified example of a listing of derived attributes, derived attribute values, subsets, rules, and the rule expressions of the rules based on the derived attribute value, and a derived "weight" of the hierarchy level and/or value of the attribute following equation 1 from Table 1:

$$W_{exp} = W_a + W_o \qquad \text{Equation 1}$$

wherein, $W_{exp}$ is the weight of the rule expression, $W_a$ is the value of the attribute, wherein 0 is the highest value and 9 is the lowest value of the attribute, and $W_o$ is the value of the operator, wherein 0.0 is the highest value and 0.8 is the lowest value.

TABLE 2

Exemplary lists of Derived Attributes (e.g., RHID),
Derived Attribute Values, Rules, and Rule Expressions

| R2D2 | Rules and Rule Expressions |
|---|---|
| (derived attributes) |  |
| R2D21 | RE1: { brand = Nike } 0.1 |
| (derived attributes values) | RE2: { brand = GreatValue & product_type = Sandals } 0.075 |
|  | RE3: { product_type = shoes } 0.2 |
| R2D22 | RE4: { brand = Nike & product_type = shoes } 0.075 |
|  | RE5: { brand = Clark & product_type = shoes } 0.075 |
|  | RE6: { brand = addidas & product_type = shoes } 0.075 |
|  | RE7: { brand = Nike & product_type = shoes & primary_shelf = Canvas } 0.065 |

In Table 2, above, the left-hand column is a simplified example of a derived attribute labeled as R2D2 for one or more products (e.g., qualifying products), where R2D21 and R2D22 are derived attribute values also referred to as subsets of the derived attribute R2D2.

In Table 2, above, the right-hand column is a simplified example of a rule and/or a rule expression, such as:

RE1: {brand=Nike} 0.1

Where, in this simplified example, RE1 is a rule, {brand=Nike} is a rule expression, and 0.1 is a weight of the expression based on the attribute and/or attribute value as calculated by the Equation 1. In several embodiments, such a table as Table 2 can use the data in this simplified example to explain how a new rule can impact and/or change a derived attribute value with corresponding rule expressions in a content catalog, such as content catalog 395 (FIGS. 3 and 6).

An advantage of using a new platform to update product information, such as a reactive attribute management platform, is that the new platform can be run on a separate thread outside of the main pipeline of content source information. One effect of using a separate thread and/or threads that can run and/or operate outside of the main pipeline can result in processors operating with an increased processing speed at which the processors can determine a rule change event and activate the rule change event for each and every product as received each second, minute, hour, a day and/or any other suitable period of time including in real time. Another advantage of using the new platform, can be using the processors to search a smaller population of products and/or product identifications that can qualify for the derived attribute value based on the current rule change event as a result of streamlining complex computing processes used in conventional methods. Moreover activating the rule change events for all of the qualifying products can be done in groups and/or populations of approximately ten thousand (10,000) or more products, or any other suitable amount of qualifying products, by concurrently batching each of the batches using separate threads (e.g., processes). Additionally, the new platform, such as a reactive attribute management platform, does not interfere with the complex computer-processes running in a main pipeline as the new platform runs on a different and/or second thread reducing and/or eliminating a search function often performed for product updates scanning and/or using the entire catalog each time a new rule change event for a product is received. Further, the reactive attribute management platform thread no longer has to compete with a main pipeline for computer resources such as a central processing unit (CPU), cache memory, and/or database storage space.

TABLE 3

Exemplary Lists of Product Identifications and Product Attributes

| Item_id | brand | product_type | primary_shelf |
|---------|-------|--------------|---------------|
| 123 | Nike | shoes | canvas |
| 234 | Adidas | shoes | |
| 456 | Clark | shoes | |
| 567 | Levis | shoes | |
| 789 | Clark | sandals | leather |

In Table 3, above, a few simplified examples of product attributes (e.g., brand, product_type, and primary_shelf) can be listed as an example of what exemplary product identifications can look like as product information and/or product data. In many embodiments, a product attribute also can include an attribute (e.g., classifier, characteristic, descriptor) that can describe one or more aspects of a product, for example, a brand, a color, a product_type, and/or a prima-ry_shelf (e.g., a logical grouping of products and/or items that can be used to determine multiple commerce decisions, such as, which products will appear on a website, a placement of the product on a webpage, creating a facet, creating facet values, among other suitable activities.) As indicated above, a product attribute for a product can be different that a derived attribute and/or a derived attribute value associated with the same product and/or product identification (e.g., qualifying product and/or qualifying product identification.)

In Table 3, above, the left-hand column further illustrates a product identification number that can be labeled, as exemplary examples, 123, 234, 456, 567, and 789. For example, in this simplified example, the product identification number 123 can describe a brand such as Nike, a product_type such as shoes, and a primary_shelf such as canvas. In several embodiments, when a new rule is received and a use case can be calculated, receiver 310 (FIGS. 3 and 6) can use a search engine to search a catalog, such as content catalog 395 (FIGS. 3 and 6), for all qualifying products (e.g., Item_id) that can include the new rule based derived attribute value, rule and rule expressions as a member of a members list for that product. The new rule can impact all of the qualifying products and/or qualifying product identifications returned from the search engine as search results. Another advantage of the new platform, such as a reactive attribute management platform, is efficiency of using computer resources and can be demonstrated when the process minimizes the use of processors during the search process on narrower and/or limited populations of qualifying products and/or qualifying product identifications to analyze and/or process (e.g., update) that can match the rule and/or rule expressions.

As explained above, in a number of embodiments, a product attribute (e.g., product_type, brand, color) can be different than a derived attribute for the same product. For example, a derived attribute can be an attribute and/or characteristic that can be derived from a rule change event, such as a rule definition and/or a command to activate the impact of a rule changing and/or modifying a derived attribute assigned (e.g., members) to one or more qualifying products and/or qualifying product identifications. In many embodiments, while a product attribute can describe a product, a derived attribute can determine how the product can be displayed, categorized and/or presented during a pre-determined period of time (e.g., seasonality, discounted pricing) as can pertain to commerce activities. For example, a shelf can be a derived attribute that can indicate that a particular product can be shown on a particular webpage in a particular way, with a particular set of information displayed, at a particular location.

TABLE 4

Examples of Product Identification, Attributes, Winning Values, Members, Member list, and/or a set of rules expressed for the respective product identification (e.g., Item_id).

| Item_id | R2D2 | exp | weight | members list |
|---------|------|-----|--------|--------------|
| 123 | R2D22 | RE7 | 0.065 | <R2D21 : RE1 : 0.1> |
| | | | | <R2D22 : RE4 : 0.075> |
| | | | | <R2D22 : RE7 : 0.065> |
| 234 | R2D22 | RE6 | 0.075 | <R2D22 : RE6 : 0.075> |
| | | | | <R2D21 : RE3 : 0.2> |
| 456 | R2D22 | RE5 | 0.075 | <R2D22 : RE5 : 0.075> |
| | | | | <R2D21 : RE3 : 0.2> |
| 567 | R2D21 | RE3 | 0.2 | <R2D21 : RE3 : 0.2> |

In Table 4, above, the right-hand column labeled "members list" can include an example of a number of derived attribute values with existing rules and rule expressions for a group of qualifying products and/or qualifying product identifications of a product. For example, product identification number 123 could have derived attribute value R2D22 with several rules and rule expressions, such as, <R2D21:RE1:0.1>, <R2D22:RE4:0.075>, and/or <R2D22:RE7:0.065>, listed as rules that could be expressed for a qualifying product in a content catalog when using the new platform. In the middle columns, the terms "exp" and "weight" can indicate the derived attribute value, rule and rule expression with the lowest weight, also referred to as a "winning value," for a qualifying product and/or qualifying product identification. In some embodiments, when a new rule and a corresponding derived attribute value can be added to the members list column, and it has the lowest weight, it can become a "winning value" for the derived attribute value of a product. In many embodiments, when a new rule and a corresponding derived attribute value become a winning value, the derived attribute value can be updated in a content catalog, such as content catalog 395 (FIGS. 3 and 6). In some embodiments, when a rule change and a derived value is added to the members column, the new rule expression weight must be the lowest number in the group of members for that "winning" derived attribute value to be changed, or it will just be another rule with a derived attribute value added to the members list.

TABLE 5

Use Case One, an Add Rule Change Event

| ADD RULE | |
|---|---|
| ADD RULE: | |
| R2D23 old {null} | |
| ↓ | |
| R2D23 new { product_type = sandals & primary_shelf = leather} | |
| findItems( ) | findItems{product_type = sandals & primary_shelf = leather } |
| <NA> | { 789 } |
| | update (R2D23, RE9, 0.2), if it is a winning value based on the current weight or else add to the updated to the member list for product identification {789} update with the R2D23 value |
| | add R2D23 as one of the values for R2D2 789, to a member list of a product with product identification {789}. |

In Table 5, above, a depiction of a simplified example of a rule change under use case one can be to an add rule change event, (e.g., ADD event). The table depicts a simplified example of use case one, which can be a new rule in this table, such as new rule R2D23 RE9: product_type=sandals & primary_shelf=leather 0.2, and can be added to any and all qualifying product and/or qualifying product identifications (Item_id), therefore a new rule can be for a new product in a content catalog. In some embodiments, the new rule can be defined as a new derived attribute value and added to all of the members list for the qualifying products (e.g., Item_id), such as adding new derived attribute value R2D23. In several embodiments, use case one can be a new rule for which an old rule (e.g., Rold} for this product does not exist at a given time.

Similar to the last use cases below, the derived attribute value with rule expressions are added to the members list for each qualifying product returned from a search and/or scan by a search engine in the content catalog.

TABLE 5A

Rules and Corresponding Expressions

| R2D2 | Rule and Corresponding Expressions |
|---|---|
| R2D21 | RE1: { brand = Nike } 0.1 |
| | RE2: { brand = GreatValue & product_type = Sandals } 0.075 |
| | RE3: { product_type = shoes } 0.2 |
| R2D22 | RE4: { brand = Nike & product_type = shoes } 0.075 |
| | RE5: { brand = Clark & product_type IN = shoes, sandals)} 0.075 |
| | RE6: { brand = adidas & product_type = shoes } 0.075 |
| | RE7: { brand = Nike & product_type = shoes & primary_shelf = Canvas } 0.065 |
| R2D23 | RE9: { product_type = sandals & primary_shelf = leather } 0.2 |

In this simplified example, Table 5A, above, includes exemplary lists of a derived attribute, such as R2D2, exemplary lists of derived attribute values, such as R2D21, R2D22, and R2D23, among other suitable derived attribute values, and exemplary rules and corresponding expressions for the exemplary derived attributes listed in Table 5A.

TABLE 6

Use Case One, Batching

| Item_id | R2D2 | exp | weight | members list |
|---|---|---|---|---|
| 123 | R2D22 | RE7 | 0.065 | <R2D21 : RE1 : 0.1> |
| | | | | <R2D22 : RE4 : 0.075> |
| | | | | <R2D22 : RE7 : 0.065> |
| 234 | R2D22 | RE6 | 0.075 | <R2D22 : RE6 : 0.075> |
| | | | | <R2D21 : RE3 : 0.2> |
| 456 | R2D21 | RE3 | 0.2 | <R2D22 : RE5 : 0.075> |
| | | | | <R2D21 : RE3 : 0.2> |
| 567 | R2D21 | RE3 | 0.2 | <R2D21 : RE3 : 0.2> |
| 789 | R2D22 | RE5 | 0.075 | <R2D23 : RE8 : 0.085> |
| | | | | <R2D22 : RE5 : 0.075> |
| | | | | <R2D23 : RE9 : 0.2> |

In Table 6 above, batching for use case one can include all derived attributes and corresponding rules, such as <R2D23:RE9:0.2>, that can be added to all qualifying products (e.g., Item_id) which in this case can be only Item_id 789, as indicated in Table 5, above. Similarly to the use cases above, the new derived attribute value can be run concurrently with other derived attribute values using different processes and threads for all qualifying products and qualifying product identifications.

TABLE 7

Use Case One, Assignment

| Item_id | R2D2 | exp | weight | members list |
|---|---|---|---|---|
| 123 | R2D22 | RE7 | 0.065 | <R2D21 : RE1 : 0.1> |
| | | | | <R2D22 : RE4 : 0.075> |
| | | | | <R2D22 : RE7 : 0.065> |
| 234 | R2D22 | RE6 | 0.075 | <R2D22 : RE6 : 0.075> |
| | | | | <R2D21 : RE3 : 0.2> |
| 456 | R2D21 | RE3 | 0.2 | <R2D22 : RE5 : 0.075> |
| | | | | <R2D21 : RE3 : 0.2> |
| 567 | R2D21 | RE3 | 0.2 | <R2D21 : RE3 : 0.2> |
| 789 | R2D22 | RE5 | 0.075 | <R2D23 : RE8 : 0.085> |
| | | | | <R2D22 : RE5 : 0.075> |
| | | | | <R2D23 : RE9 : 0.2> |

Figure 7:
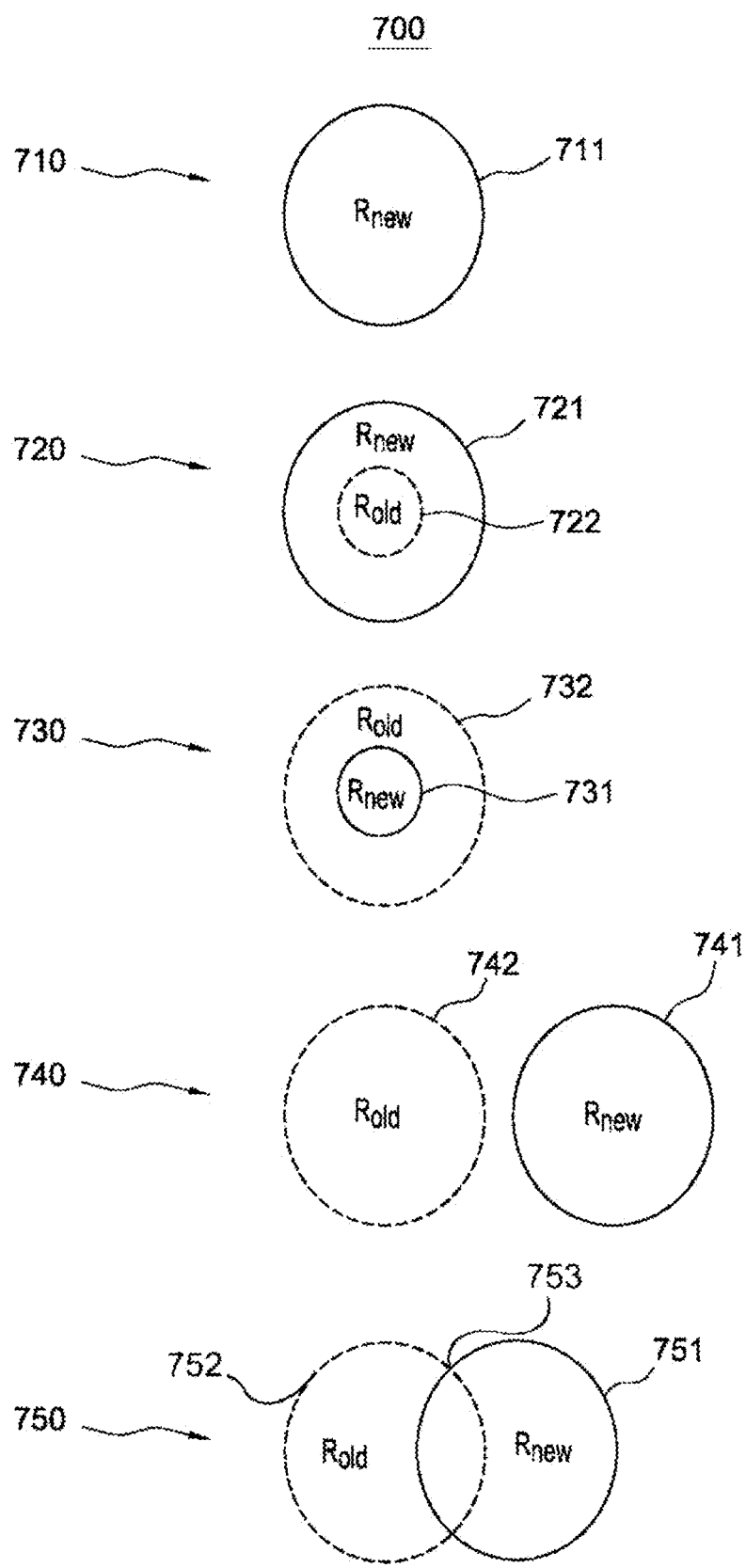
FIG. 7 illustrates multiple diagrams for a system according to another embodiment.

In Table 7, above, a simplified example of assigning a winning value for use case one can include: Rnew is added as a new rule, un-modified by Rold as there is no Rold, and the rule command is update, so product identification 789, in this simplified example, receives a new member <R2D23: RE9:0.2> in the members list column. In many examples, an illustration of the impact of use case one can be described in further details below in Rnew 711 and in block 710 (FIG. 7).

In some embodiments, activity 407, of an ADD event can be performed, when a new rule is defined and there is no existing old rule, such as in use case one, the derived attribute value can be added to the members list of all products that qualify for the new rule, as further described above in activity 407 (FIG. 4).

TABLE 8

Use Case Two, New Rule Superset of Old Rule

UPDATE RULE [command]
UPDATE RULE:
    R2D21 old {brand = Nike} || {brand = GreatValue & product_type = Sandals} || {product_type = shoes} 0.2
    ↓
    R2D21 new {brand = Nike} || {brand = GreatValue & product_type = Sandal} || {product_type (shoes, sandals)} 0.25

| findItems({product_type = shoes} – {product_type (shoes, sandals)}) | findItems({product_type (shoes, sandals)}) |
|---|---|
| { } | { 123, 234, 456, 567 } update (R2D21, RE3, 0.25) if winning value on the current weight update or else add to the members list |

In Table 8, above, use case two can include a scenario where the new rule becomes a superset of the old rule, such as, when Rold minus Rnew results in new rule expression, such as, R2D21 RE3 {product_type IN (shoes, sandals)} 0.25, which effectively expands the scope of Rold to shoes and sandals. In this simplified example, the command and/or instruction can be to update Rold with Rnew.

Similar to the last use case above, a search of the content catalog can be performed with no results for Rold and several results of qualifying products and qualifying product identifications for Rnew, such as 123, 234, 456, and 567. In many embodiments, when a new rule expression is added under use case two, the new rule expression can be illustrated as a superset of the old, as described in further detail below in block 720 (FIG. 7).

TABLE 8A

| R2D2 | Rule and Corresponding Expressions |
|---|---|
| R2D21 | RE1: { brand = Nike } 0.1<br>RE2: { brand = GreatValue & product_type = Sandals } 0.075<br>RE3: { product_type = shoes } 0.2 |
| R2D22 | RE4: { brand = Nike & product_type = shoes } 0.075<br>RE5: { brand = Clark & product_type IN = shoes, sandals)} 0.075<br>RE6: { brand = adidas & product_type = shoes } 0.075<br>RE7: { brand = Nike & product_type = shoes & primary_shelf = Canvas } 0.065 |
| R2D23 | RE9: { product_type = sandals & primary_shelf = leather } 0.2 |

In this simplified example, Table 8A, above, can include exemplary lists of a derived attribute, such as R2D2, exemplary lists of derived attribute values, such as R2D21, R2D22, and R2D23, among other suitable derived attribute values, and exemplary rules and corresponding expressions for the exemplary derived attributes listed in Table 8A.

TABLE 9

Use Case Two, Batching

| Item_id | R2D2 | exp | weight | members list |
|---|---|---|---|---|
| 123 | R2D22 | RE7 | 0.065 | <R2D21 : RE1 : 0.1><br><R2D22 : RE4 : 0.075><br><R2D22 : RE7 : 0.065><br><R2D21 : RE3 : 0.2> |
| 234 | R2D22 | RE6 | 0.075 | <R2D22 : RE6 : 0.075><br><R2D21 : RE3 : 0.2> |
| 456 | R2D22 | RE5 | 0.075 | <R2D22 : RE5 : 0.075><br><R2D21 : RE3 : 0.2> |
| 567 | R2D21 | RE3 | 0.2 | <R2D21 : RE3 : 0.2> |

In Table 9, above, batching for use case two can include the derived attribute with rule expressions, such as, <R2D21:RE3:0.2> that can be added to each members list of each qualifying product and/or qualifying product identification, such as, 123, 234, 456, and 567. In a simplified example for use case two in Table 9, all derived attributes can be added to all qualifying products (e.g., Item_id), such as Item_id 123, 234, 456, and 567 and derived attribute <R2D21:RE3:0.2>.

TABLE 10

Use Case Two, Assignment

| Item_id | R2D2 | exp | weight | members list |
|---|---|---|---|---|
| 123 | R2D22 | RE7 | 0.065 | <R2D21 : RE1 : 0.1><br><R2D22 : RE4 : 0.075><br><R2D22 : RE7 : 0.065><br><R2D21 : RE3 : 0.25> |
| 234 | R2D22 | RE6 | 0.075 | <R2D22 : RE6 : 0.075><br><R2D21 : RE3 : 0.25> |
| 456 | R2D22 | RE5 | 0.075 | <R2D22 : RE5 : 0.075><br><R2D21 : RE3 : 0.25> |
| 567 | R2D21 | RE3 | 0.25 | <R2D21 : RE3 : 0.25> |

In Table 10, above, simplified example of assigning a winning value for use case two can include: Rold, such as derived attribute value, <R2D21:RE3:0.2>, can be updated and/or replaced by Rnew, <(R2D21, RE3, 0.25)>, in all qualifying products and all qualifying product identifications, such as 123, 234, 456, and 567. In many embodiments, such as product identification 567, Rnew can be the "winning value," as indicated by the lowest weight, such as 0.25, in the members list of 567. Whereas Rnew is only added to the members list for 123, 234, and 456, therefore Rnew does not require a change and/or update of the newly added derived attribute value R2D21 to the members list. In a number of embodiments, Item_id 567 can be updated in the content catalog with Rnew.

In several embodiments, activity 407, of describing exemplary examples when an ADD event can be performed, such as, when a new rule is a superset of an old rule, such as in use case two, the derived attribute value can be added to the members list of all products that qualify for the new rule, and as further described below in FIG. 8.

TABLE 11

Use Case Three, New Rule Subset of Old Rule

DELETE RULE
DELETE RULE:
    R2D21 old { brand = Nike} || {brand = GreatValue &
    product_type = Sandals} || {product_type = shoes}0.2
    ↓
    R2D21 new { brand = Nike} || {brand = GreatValue &
    product_type = Sandals}
    Note: rule expression {product_type= shoes}0.2 has been
    removed from R2D21 indicating that this can be a delete rule.
findItems({product_type = shoes})    findItems( )
   { 123, 234, 456, 567, 789}    <NA>
deprecate (delete) <(R2D21, RE3, 0.2)> from
the current assignments In Table 11, above, use case three can be include where the new rule is a subset of an old rule. In some embodiments, the new rule has excluded some products in the old rule. In several embodiments, use case three can result in performing a DELETE event where the derived attribute value will be deleted from all the qualifying products (e.g., Item_id). In some embodiments, when Rnew can be missing (e.g., removed) a rule expression that can still be in Rold, use case three can be set up for a delete rule event.

Similar to the last use cases above, the derived attribute value with rule expressions are added to the members list for each qualifying product returned from a search and/or scan by a search engine in the content catalog. In use case three, the command is to delete (i.e., deprecate) the derived attributes and rule expressions from the current assignments of all product identifications returned in the search results of the catalog, such as <(R2D21, RE3, 0.2)>. In this simplified example, a search is performed for the old rule since the old rule no longer applies and resulted in 123, 234, 456, 567, and 789. In this simplified example, no search for a new rule can be performed since use case three is a delete rule, nothing (e.g., no new rules) different from old rule, therefore there is no new rule (Rnew) to add.

TABLE 11A

Rules and Expressions

| R2D2 | Rule and Expressions |
|---|---|
| R2D21 | RE1: { brand = Nike } 0.1 |
|  | RE2: { brand = GreatValue & product_type = Sandals } 0.075 |
|  | RE3: { product_type = shoes} 0.2 |
| R2D22 | RE4: { brand = Nike & product_type = shoes } 0.075 |
|  | RE5: { brand = Clark & product_type IN (shoes, sandals) } 0.075 |
|  | RE6: { brand = addidas & product_type = shoes } 0.075 |
|  | RE7: { brand = Nike & product_type = shoes & primary_shelf = Canvas } 0.065 |
| R2D23 | RE8: { product_type = sandals & primary_shelf = leather } 0.085 |
|  | RE9: { product_type = sandals } 0.2 |

In this simplified example, Table 11A, above, can includes exemplary lists of a derived attribute, such as R2D2, exemplary lists of derived attribute values, such as R2D21, R2D22, and R2D23, among other suitable derived attribute values, and exemplary rules and corresponding expressions for the exemplary derived attributes listed in Table 11A.

TABLE 12

Use Case Three, Batching

| Item_id | R2D2 | exp | weight | members list |
|---|---|---|---|---|
| 123 | R2D22 | RE7 | 0.065 | <R2D21 : RE1 : 0.1> |
|  |  |  |  | <R2D22 : RE4 : 0.075> |
|  |  |  |  | <R2D22 : RE7 : 0.065> |
|  |  |  |  | <R2D21 : RE3 : 0.2> |
| 234 | R2D22 | RE6 | 0.075 | <R2D22 : RE6 : 0.075> |
|  |  |  |  | <R2D21 : RE3 : 0.2> |
| 456 | R2D22 | RE5 | 0.075 | <R2D22 : RE5 : 0.075> |
|  |  |  |  | <R2D21 : RE3 : 0.2> |
| 567 | R2D21 | RE3 | 0.2 | <R2D21 : RE3 : 0.2> |
| 789 | R2D21 | RE3 | 0.2 | <R2D23 : RE8 : 0.285> |
|  |  |  |  | <R2D22 : RE5 : 2.275> |
|  |  |  |  | <R2D21 : RE3 : 0.2> |

In Table 12, above, batching in use case three can include the derived attribute with rule expressions, such as, <R2D21:RE3:0.2> being deleted from each members list of each qualifying product, such as, 123, 234, 456, 567, and 789. In this simplified example in Table 12, the derived attribute for 567, such as <R2D21:RE3:0.2> was a "winning value" and deleted creating an empty or null set of the derived attribute value.

TABLE 13

Use Case Three, Assignment

| Item_id | R2D2 | exp | weight | members list |
|---|---|---|---|---|
| 123 | R2D22 | RE7 | 0.065 | <R2D21 : RE1 : 0.1> |
|  |  |  |  | <R2D22 : RE4 : 0.075> |
|  |  |  |  | <R2D22 : RE7 : 0.065> |
| 234 | R2D22 | RE6 | 0.075 | <R2D22 : RE6 : 0.075> |
| 456 | R2D22 | RE5 | 0.075 | <R2D22 : RE5 : 0.075> |
| 567 | Miscellaneous |  |  |  |
| 789 | R2D22 | RE5 | 0.275 | <R2D23 : RE8 : 0.085> |
|  |  |  |  | <R2D22 : RE5 : 0.275> |
|  |  |  |  | <R2D23 : RE9 : 0.2> |

In Table 13, above, a simplified example of assigning a winning value for use case three can include: Rnew did not change Rold and the command was to delete the derived attributes from the all qualifying products (e.g., Item_id). In many embodiments, such a delete command can delete the <R2D21:RE3:0.2> from the members list for Item_Id 123, 234, 456, 567, and 789. In some embodiments, such as in Item_id 567, deletion of a derived attribute value and the expression, such as <R2D21:RE3:0.2>, can result in an empty set expressed as "Miscellaneous" in Table 13 above.

As a simplified example, after the delete command has been performed in Table 13, Item_Id 567 can become an empty set, and there is no change to Item_id 123, 234, 456, and 789 by the deletion of derived attribute value <(R2D21, RE3, 0.2)>, since there is no change in the winning value for either of those derived attribute values for a qualifying product (e.g., Item_id.) The product identification for Item_id 567 is not deleted from the content catalog as only the derived attribute has been deleted and additional new derived attributes for Item_id can be added based on new rule change events. Use case three is illustrated in greater detail below in block 730 (FIG. 7).

In some embodiments, activity 407 of describing exemplary scenarios when an ADD event can be performed, such as, when a new rule is a subset of an old rule, such as in use case three, the derived attribute value can be added to the members list of all qualifying products that qualify for the new rule, and as further described below in FIG. 8.

Table for 14. Use Case Four, New Rule fully different from Old Rule

| Table for 14. Use Case Four, New Rule fully different from Old Rule | |
|---|---|
| UPDATE RULE R2D21 old {brand = Nike} 0.1 ‖ {brand = GrandValue & product_type = Sandals} 0.075 ‖ {product_type = shoes} 0.2 ↓ R2D21 new {brand = GreatValue} 0.1 ‖ {product_type = TShirts} 0.08 | |
| findItems ({ brand = Nike} ‖ {brand = GrandValue & product_type = Sandals} ‖ {product_type = shoes}) | findItems ({ brand = GreatValue} ‖ {product_type = TShirts}) |
| {123, 234, 456} | {567, 789} |
| Delete (R2D21, RE1, 0.1), (R2D21, RE2, 0.075), (R2D21, RE3, 0.2) whichever exists, from the members list for the above items. | Add (R2D21, RE1, 0.1), (R2D21, RE2, 0.08) to the members list for the above items. |

Referring to use case four, a new rule can be fully different from an old rule for the product and/or product identification that can result in deleting part of Rold, add part of Rnew and keeping the intersection of Rold and Rnew without any changes. In Table 14, in use case four, Rold can get modified to become Rnew, such that, the use case can result in two sets of product identifications and two sets of commands for Rold and Rnew. When Rold minus Rnew results in use case four, the derived attribute and rule can be assigned as Rnew that can be added to the population of qualifying products using a command to add and/or update a rule expression concurrently, where Rold can be removed as a competing rule from the members list. Use case four is further illustrated in greater detail below in block 740 (FIG. 7).

Similar to the last use cases above, the derived attribute value with rule expressions are added to the members list for each qualifying product returned from a search and/or scan by a search engine in the content catalog.

TABLE 14A

| Old rules (Rold) | |
|---|---|
| R2D2 | Expressions |
| R2D21 | RE1: {brand = Nike} 0.1 RE2: {brand = GreatValue & product_type = Sandals} 0.075 RE3: {product_type = shoes} 0.2 |
| R2D22 | RE4: {brand = Nike & product_type = shoes} 0.075 RE5: {brand = Clark & product_type IN (shoes, sandals)} 0.075 RE6: {brand = addidas & product_type = shoes} 0.075 RE7: {brand = Nike & product_type = shoes & primary_shelf = Canvas} 0.065 |
| R2D23 | RE8: {product_type = sandals & primary_shelf = leather} 0.085 RE9: {product_type = sandals} 0.2 |

In this simplified example, Table 14A, above, can correspond to old rule (Rold) that can include rule expressions associated with derived attribute value R2D21 of the old rule prior to a rule change event. Table 14A can includes exemplary lists of a derived attribute, such as R2D2, exemplary lists of derived attribute values, such as R2D21, R2D22, and R2D23, among other suitable derived attribute values, and exemplary rules and corresponding expressions for the exemplary derived attributes listed in Table 14A.

TABLE 14B

| New Rule (Rnew) | |
|---|---|
| R2D2 | Expressions |
| R2D21 | RE1: {brand = GreatValue} 0.1 RE2: {product_type = TShirts} 0.08 |
| R2D22 | RE4: {brand = Nike & product_type = shoes} 0.075 RE5: {brand = Clark & product_type IN (shoes, sandals)} 0.075 RE6: {brand = addidas & product_type = shoes} 0.075 RE7: {brand = Nike & product_type = shoes & primary_shelf = Canvas} 0.065 |
| R2D23 | RE8: {product_type = sandals & primary_shelf = leather} 0.085 RE9: {product_type = sandals} 0.2 |

In this simplified example, Table 14B, above, can correspond to the derived attribute value, such as R2D21, where the rule expressions were updated to include the new rule and rule expressions. Table 14B can includes exemplary lists of a derived attribute, such as R2D2, exemplary lists of derived attribute values, such as R2D21, R2D22, and R2D23, among other suitable derived attribute values, and exemplary rules and corresponding expressions for the exemplary derived attributes listed in Table 14B.

Table for 15. Use Case Four, Batching

| Table for 15. Use Case Four, Batching | | | | |
|---|---|---|---|---|
| Item_id | R2D2 | exp | weight | members |
| 123 | R2D22 | RE7 | 0.05 | [[<R2D21 : RE1 : 0.1> RE1: {brand = Nike} 0.1]] [[<R2D21; E2: {brand = GreatValue & product_type = Sandals} 0.075>]] [[<R2D21 : RE3: {product_type = shoes} 0.2>]] <R2D21 : RE2 : 0.075> <R2D22 : RE7 : 0.05> |
| 234 | R2D21 | RE2 | 0.075 | [[<R2D21 : RE1 : 0.1> RE1: {brand = Nike} 0.1]] [[<R2D21; E2: {brand = GreatValue & product_type = Sandals} 0.075>]] |
| 456 | R2D22 | RE5 | 0.075 | [[<R2D21 : RE1 : 0.1> RE1: {brand = Nike} 0.1]] [[<R2D21; E2: {brand = GreatValue & product_type = Sandals} 0.075>]] |
| 567 | R2D23 | RE3 | 0.02 | <R2D23 : RE3 : 0.02> R2D21: RE1: {brand = GreatValue} 0.1 R2D21: RE2: {product_type = TShirts} 0.08 |
| 789 | R2D23 | RE5 | 0.075 | <R2D22 : RE5 : 0.1> <R2D23 : RE5 : 0.075> R2D21:RE1: {brand = GreatValue} 0.1 R2D21:RE2: {product_type = TShirts} 0.08 |

In Table 15, batching for use case four can include the Rold rule expressions, such as R2D21, RE1, 0.1, R2D21, RE2, 0.075, R2D21, RE3, 0.2 that can be deleted from 123, 234, 456 and Rnew rule expressions, such as, R2D21, RE1, 0.1, R2D21, RE2, 0.08 that can be added to 567 and 789. In Table 15, the activity of deleting the Rold rule expressions, such as R2D21, RE1, 0.1, R2D21, RE2, 0.075, R2D21, RE3, 0.2 from 123, 234, 456, can be illustrated by double brackets "[[ ]]."

Table for 16. Use Case Four, Assignment

Table for 16. Use Case Four, Assignment

| Item_id | R2D2 | exp | weight | members |
|---|---|---|---|---|
| 123 | R2D22 | RE7 | 0.05 | <R2D22 : RE7 : 0.05> |
| 234 | MISC | NA | NA | |
| 456 | R2D22 | RE5 | 0.075 | <R2D22 : RE5 : 0.075> |
| 567 | R2D23 | RE3 | 0.02 | <R2D23 : RE3 : 0.02> |
| | | | | <R2D21 : RE1 : 0.1> |
| | | | | <R2D21 : RE2 : 0.08> |
| 789 | R2D21 | RE2 | 0.08 | <R2D22 : RE5 : 0.1> |
| | | | | <R2D23 : RE5 : 0.075> |
| | | | | <R2D21 : RE1 : 0.1> |
| | | | | <R2D21 : RE2 : 0.08> |

Table 16, a simplified example of assigning a winning value for use case four can include: the impact of deleting Rold from product identifications (e.g., Item_id) 123, 234 and 456. In this simplified example, 123, 234 and 456, any existing rule expressions among R2D21, RE1, 0.1, R2D21, RE2, 0.075, and R2D21, RE3, 0.2 on the derived attribute value R2D21, can be deleted from the member list.

In this simplified example, the derived attributes and new rule expressions, <R2D21:RE1:0.1>, <R2D21:RE2:0.08> can be added to the members list for product identifications (e.g., Item_id) 567 and 789. In this simplified example, 567 and 789 (e.g., Item_Id), the new rule expressions, <R2D21:RE1:0.1>, <R2D21:RE2:0.08> on the derived attribute value R2D21 is added to the member list. Further, in this simplified example, if a product identification (e.g., Item_id) matches only one of the rule expressions out of two in the new rule, only rule expression can be added to the product identification.

In some embodiments, activity 407 of describing exemplary scenarios when an ADD event can be performed, such as, when a new rule is completely different from the old rule, the derived attribute value can be added to the members list of all qualifying products that qualify for the new rule, and as further described below in FIG. 8.

TABLE 17

Use Case Five, New Rule Intersects with Old Rule

UPDATE RULE
UPDATE RULE:
    R2D22 old {brand = Nike & product_type = shoes} || {brand = Clark & product_type = shoes} || {brand = adidas & product_type = shoes} || {brand = Nike & product_type = shoes & primary_shelf = Canvas} 0.075
    ↓
    R2D22 new {brand = Nike & product_type = shoes} || {brand = Clark & product_type = (sandals)} || {brand = adidas & product_type = shoes} || {brand = Nike & product_type = shoes & primary_shelf = Canvas} 0.075

| findItems({brand = Clark & product_type = shoes} − {brand = Clark & product_type = sandals}) {two searches means remove sandals) | findItems({brand = Clark & product_type = (sandals)) |
|---|---|
| {456} | { 789 } |
| deprecate (delete) (R2D22, RE5, 0.075) from the current assignments (members list) | add (R2D22, RE5, 0.075), if winning on the current weight update or else add the members list |

In Table 17, above, illustrates use case five. In use case five, Rold was modified by Rnew which led to an overlap of rules affecting certain product identifications differently. The command is to update the Rold which can lead to a delete command for Rold and an update command for Rnew.

Similar to the last use cases above, the derived attribute value with rule expressions are added to the members list for each qualifying product returned from a search and/or scan by a search engine in the content catalog.

TABLE 17A

Rules and Expressions

| R2D2 | Rules and Expressions |
|---|---|
| R2D21 | RE1: { brand = Nike } 0.1 |
| | RE2: { brand = GreatValue & product_type = Sandals } 0.075 |
| | RE3: { product_type = shoes } 0.2 |
| R2D22 | RE4: { brand = Nike & product_type = shoes } 0.075 |
| | RE5: { brand = Clark & product_type IN = shoes, sandals)} 0.075 |
| | RE6: { brand = addidas & product_type = shoes } 0.075 |
| | RE7: { brand = Nike & product_type = shoes & primary_shelf = Canvas } 0.065 |
| R2D23 | RE8: { product_type = sandals & primary_shelf = leather } 0.085 |

In this simplified example, Table 17A, above, can includes exemplary lists of a derived attribute, such as R2D2, exemplary lists of derived attribute values, such as R2D21, R2D22, and R2D23, among other suitable derived attribute values, and exemplary rules and corresponding expressions for the exemplary derived attributes listed in Table 17A.

In some embodiments, activity 407 of describing exemplary scenarios when an ADD event can be performed, such as, when a new rule intersects with an old rule, such as in use case five, the derived attribute value can be added to the members list of all qualifying products that qualify for the new rule, and as further described below in FIG. 8. In several embodiments, performing both an ADD and a DELETE event results in an UPDATE event.

TABLE 18

Use Case Five, Batching

| Item_id | R2D2 | exp | weight | members list |
|---|---|---|---|---|
| 123 | R2D22 | RE7 | 0.065 | <R2D21 : RE1 : 0.1> |
| | | | | <R2D22 : RE4 : 0.075> |
| | | | | <R2D22 : RE7 : 0.065> |
| 234 | R2D22 | RE6 | 0.075 | <R2D22 : RE6 : 0.075> |
| | | | | <R2D21 : RE3 : 0.2> |
| 456 | R2D21 | RE3 | 0.2 | <R2D22 : RE5 : 0.075> deleting |
| | | | | <R2D21 : RE3 : 0.2> |
| 567 | R2D21 | RE3 | 0.2 | <R2D21 : RE3 : 0.2> |
| 789 | R2D22 | RE5 | 0.075 | <R2D23 : RE8 : 0.085> |
| | | | | <R2D22 : RE5 : 0.075> added |

In Table 18, similar to the last use cases above, batching for use case five can include the derived attribute value with rule expressions that can be added to the members list for each qualifying product returned from a search or scan by a search engine in the catalog and Rold returned product identification 456 and Rold, <R2D22:RE5:0.075> can be deleted from the members list of 456.

TABLE 19

Use Case Five, Assignments

| Item_id | R2D2 | exp | weight | members list |
|---------|------|-----|--------|--------------|
| 123 | R2D22 | RE7 | 0.065 | <R2D21 : RE1 : 0.1><br><R2D22 : RE4 : 0.075><br><R2D22 : RE7 : 0.065> |
| 234 | R2D22 | RE6 | 0.075 | <R2D22 : RE6 : 0.075><br><R2D21 : RE3 : 0.2> |
| 456 | R2D21 | RE3 | 0.2 | <R2D21 : RE3 : 0.2> |
| 567 | R2D21 | RE3 | 0.2 | <R2D21 : RE3 : 0.2> |
| 789 | R2D22 | RE5 | 0.075 | <R2D23 : RE8 : 0.085><br><R2D22 : RE5 : 0.075> |

In Table 19, a simplified example of assigning a winning value for use case five can include: Rold returned product identification 456 and a command to delete Rold, <R2D22:RE5:0.075> from the member column of 456. Rnew returned product identification 789 and a "winning value" for Rnew, <R2D22:RE5:0.075>, therefore a change in the catalog is made for 789. Use case five is illustrated in greater detail below in block 750 (FIG. 7).

Returning to FIG. 4, in several embodiments, after activity 407, method 400 further can include an activity 408 of storing, in the store database, the first use case as part of the at least one of the one or more derived attributes and derived attribute values associated with the product and product identification. In some embodiments of method 400, when product can be a new product added to the content catalog as an old rule does not necessarily exist for the product identification of the product, and the use case of the one or more use cases can comprise the new rule.

Turning to the next drawing, FIG. 5 illustrates a block diagram of system 300, according to the embodiment shown in FIG. 3. Ecosystem 305, rules engine 360, content source 370, content feed 380, webserver 390 and/or content catalog 395 are merely exemplary and are not limited to the embodiments presented herein, see also FIG. 6. Ecosystem 305, rules engine 360, content source 370, content feed 380, webserver 390 and/or content catalog 395 can be employed in many different embodiments or examples not specifically depicted or described herein. In some embodiments, certain elements or systems of ecosystem 305, rules engine 360, content source 370, content feed 380, webserver 390 and/or content catalog 395 can perform various procedures, processes, and/or acts. In other embodiments, the procedures, processes, and/or acts can be performed by other suitable elements or systems. In many embodiments, the systems of ecosystem 305, rules engine 360, content source 370, content feed 380, webserver 390 and/or content catalog 395 can be modules of computing instructions (e.g., software modules) stored at non-transitory computer readable media. In other embodiments, the systems of ecosystem 305, rules engine 360, content source 370, content feed 380, webserver 390 and/or content catalog 395 can be implemented in hardware.

In many embodiments, content source 370 can include a communication system 520. In certain embodiments, communication system 520 can at least partially perform: (i) activity 401 (FIG. 4) of receiving, from a content source, product information for a product of one or more products, wherein the product information comprises (a) core product data for the product and (b) a product identification for the product; and/or (ii) activity 403 (FIG. 4) of transmitting the product identification for the product to a content feed and a topology system 321 (FIGS. 3 and 6).

In many embodiments, content source 370 also can include a memory system 525. In several embodiments, memory system 525 can at least partially perform activity 401 (FIG. 4) of receiving, from a content source, product information for a product of one or more products, wherein the product information comprises (a) core product data for the product and (b) a product identification for the product, wherein receiving, from the content source, the product information further comprises receiving the product information for the product from one or more third-party sources.

In a number of embodiments, content feed 380 can include a communication system 530. In certain embodiments, communication system 530 can at least partially perform: (a) activity 404 (FIG. 4) of transmitting the one or more derived attributes to the content feed, wherein the content feed merges the at least one of the one or more derived attributes with the product information based on matching the product identification of the product with the one or more derived attributes such that the product information, in the content feed, comprises the core product data, the product identification, and the at least one of the one or more derived attributes, and wherein the content feed updates the product information, as merged, of the product of the one or more products in the content catalog; (b) activity 403 (FIG. 4) of transmitting the product identification for the product to the topology system 321 (FIGS. 3 and 6); and (c) other activities such as searching the store database, via the topology system, for the one or more derived attributes that match the product identification, wherein the one or more derived attributes that match the product identification are transmitted to the content feed with the product identification for merger with the core product data for the product.

In many of embodiments, content feed 380 also can include a memory system 535. In certain embodiments, memory system 535 can at least partially perform activity 404 (FIG. 4) of transmitting the one or more derived attributes to the content feed, wherein the content feed merges the at least one of the one or more derived attributes with the product information based on matching the product identification of the product with the one or more derived attributes such that the product information, in the content feed, comprises the core product data, the product identification, and the at least one of the one or more derived attributes, and wherein the content feed updates the product information, as merged, of the product of the one or more products in the content catalog, and activity 403 (FIG. 4) of transmitting the product identification for the product to the topology system 321 (FIGS. 3 and 6), and other activities such as searching the store database, via the topology system, for the one or more derived attributes that match the product identification, wherein the one or more derived attributes that match the product identification are transmitted to the content feed with the product identification for merger with the core product data for the product.

In a number of embodiments, rules engine 360 can include a communication system 540. In certain embodiments, communication system 540 can at least partially perform activity 405 (FIG. 4) of receiving, by a receiver and from a rules engine, a new rule affecting the product, and other activities where the new rule affecting the product comprises a deletion of the old rule associated with the product identification of the product, wherein the old rule is deleted from the derived attributes and/or derived attribute values prior to being added to the product information of the product.

In a number of embodiments, rules engine 360 also can include a memory system 545. In certain embodiments, memory system 545 can at least partially perform activity 405 (FIG. 4) of receiving, by a receiver and from a rules engine, a new rule affecting the product, and other activities where the new rule affecting the product comprises a deletion of the old rule associated with the product identification of the product, wherein the old rule is deleted from the derived attributes and/or derived attribute values prior to being added to the product information of the product.

In many embodiments, ecosystem 305 can include a receiver system 510. In certain embodiments, receiver system 510 can at least partially perform (a) activity 407 (FIG. 4) of determining, by the receiver, a first use case (which is not limited to use case one, as described above with reference to FIG. 7 below) of one or more use cases based on the old rule minus the new rule, and (b) activity 407 (FIG. 4) of determining, by the receiver, the first use case of the one or more use cases based on the old rule minus the new rule, including assigning the use case an expression weight to determine a number of product identifications for the one or more products impacted by the use case, wherein the product identifications comprise the product identification.

In many embodiments, ecosystem 305 can include a communication system 515. In certain embodiments, communication system 515 can at least partially perform: (a) activity 402 (FIG. 4) of storing one or more derived attributes of the one or more products in a store database, wherein the one or more derived attributes are based at least on a respective use case of one or more uses cases that affects the one or more products presented in a content catalog, wherein at least one of the one or more derived attributes affects at least the product of the one or more products, including matching the one or more derived attributes with more than one of one or more product identifications of the one or more products received by the content source, wherein the one or more product identifications comprise the product identification; and/or (b) activity 404 (FIG. 4) of transmitting the one or more derived attributes to the content feed and the topology system 321 (FIGS. 3 and 6), wherein the content feed merges the at least one of the one or more derived attributes with the product information based on matching the product identification of the product with the one or more derived attributes such that the product information, in the content feed, comprises the core product data, the product identification, and the at least one of the one or more derived attributes, and wherein the content feed updates the product information, as merged, of the product of the one or more products in the content catalog, including searching the store database, via the topology system, for the one or more derived attributes and derived attribute values that match the product identification of the product, wherein the one or more derived attributes that match the product identification are transmitted to the content feed with the product identification for merger with the core product data for the product.

In many embodiments, ecosystem 305 can include a memory system 512. In certain embodiments, memory system 512 can at least partially perform activity 405 (FIG. 4) of receiving, by receiver 310 (FIGS. 3 and 6) and rules engine 360, a new rule affecting the product.

In several embodiments, web server 390 can include a communication system 550. In many embodiments, communication system 550 can communicate with content catalog 395 of receiving and/or retrieving product information for a website and/or an API request. In some embodiments, web server 390 can include a memory system 550. In a number of embodiments, memory system 550 can at least store product information received from content catalog 395.

In many embodiments, content catalog 395 can include a communication system 505. In certain embodiments, communication system 505 can at least partially perform activity 406 (FIG. 4) of searching by receiver 310, (FIGS. 3 and 6), content catalog 395 for a qualifying product and/or qualifying product identification for the product.

In several embodiments, content catalog 395 can include a memory system 506. In some embodiments, memory system 506 can at least partially perform activity 402 (FIG. 4) of storing, in a store database 333 (FIGS. 3 and 6), one or more derived attributes of the one or more products based at least on a use case that affects the one or more products presented in content catalog 395.

Referring to FIG. 6, illustrates a more detailed view of system 300. System 300 can include additional components, such as one or more queues, such as a queue 630, a queue 655, and/or a queue 695. Queue 630, queue 655, and/or queue 695 are merely exemplary and are not limited to the embodiments presented herein. Queue 630, queue 655, and/or queue 695 can be employed in many different embodiments or examples not specifically depicted or described herein. In some embodiments, certain elements or systems of queue 630, queue 655, and/or queue 695 can perform various procedures, processes, and/or acts. In other embodiments, the procedures, processes, and/or acts can be performed by other suitable elements or systems.

In some embodiments, system 300 can include a queue 630 that can function as an intermediary holding area accumulating product information received from content source 370 for a pre-determined retention period of time before sending all of the product information to content feed 380. In several embodiments, queue 630 can function as an intermediary pathway in which to transmit product information comprising core product data to content feed 380. In some embodiments system 300 can include queue 630 that can function as an intermediary holding area accumulating product information received from content source 370 for a pre-determined retention period of time before sending all of the product information to topology system 321 (FIGS. 3 and 6). In several embodiments, queue 630 can function as an intermediary pathway in which to transmit product information comprising core product data to topology system 321.

In some embodiments system 300 can include a queue 655 can function as an intermediary holding area accumulating rules received from rules engine 360 for a pre-determined retention period of time before sending all of the rules, Rold and Rnew, to receiver 310. In several embodiments, queue 655 can function as an intermediary pathway in which to transmit rules from a rules engine, such as rules engine 360 to receiver 310, and receiver 310 operates within ecosystem 305.

In some embodiments system 300 can include queue 695, and queue 695 can function as an intermediary holding area accumulating derived attributes and derived attribute values received from a database, such as store database 333, for a pre-determined retention period of time before sending all of the derived attributes and derived attribute values to content feed 380. In several embodiments system 300 can include queue 695 to receive the "winning value" from topology system 321 associated with one or more qualifying products and qualifying product identifications. In a number for embodiments, queue 695 can operate within ecosystem 305 by feeding and/or streaming "winning values" and/or derived product attribute values to content feed 380.

As indicated above, FIG. 6 illustrates a more detailed view of System 300 that further can include one or more domains, such as, a domain_1 671, a domain_2 672, a domain_3 673, and/or a domain_n 674. In several embodiments, one or more domains, such as domain_1 671, domain_2 672, domain_3 673, and/or domain_n 674, are merely exemplary and are not limited to the embodiments presented herein. In some embodiments, each of the domains can be exclusive to one qualifying product and/or one qualifying product identification where receiver 310 can send all of the corresponding rule change events (e.g., use cases) that match each of the qualifying product and/or qualifying product identifications of each of the domains. In a number of embodiments, each of the domains can be non-exclusive to one qualifying product and/or qualifying product identification and all of the corresponding rule change events (e.g., use cases) for the qualifying product and/or qualifying product identification. In several embodiments, similar to the one or more domains, domain_1 671, domain_2 672, domain_3 673, and/or domain_n 674 can be employed in many different embodiments or examples not specifically depicted or described herein. In some embodiments, certain elements or systems of domain_1 671, domain_2 672, domain_3 673, and/or domain_n 674 can perform various procedures, processes, and/or acts. In other embodiments, the procedures, processes, and/or acts can be performed by other suitable elements or systems.

In several embodiments, system 300 also can include domain_1 671, which can function as a holding area and/or pathway to receive use case commands and/or instructions (e.g., add, delete, update) for each qualifying product and/or qualifying product identification from receiver 310. In some embodiments, domain_1 671 can include one qualifying product and/or qualifying product identification and all corresponding rule change events (e.g., use cases) for the qualifying product and/or qualifying product identification. In many embodiments, system 300 also can include other domains, such as domain_2 672, domain_3 673, and/or domain_n 674, and each of the domain systems can perform the similar functions as domain_1 671, as described above. In several embodiments, domain_1 671 can receive, from receiver 310, commands and/or instructions (e.g., add, delete, update) derived from use cases to batch and/or activate the commands and/or instructions on the population of each of the qualified products and/or qualified product identifications associated with a use case, as described in further detail in FIGS. 3 and 8.

In various embodiments, batching and/or activating the instructions from a rule change event (e.g., use case) can be performed in one or more topology domain systems, such as, topology domain system_1 322-1, topology domain system_2 322-2, topology domain system_3 322-3, and/or topology domain system_n 3221-n, as described in further detail below in FIG. 8. In a number of embodiments, system 300 can include one or more topology domains, such as topology domain system_1 322-1, that can function as a holding area accumulating commands and/or instructions from use cases for each domain for a predetermined retention period of time before sending all use case information to store database 333 for storage. In some embodiments, each of the topology domains can be exclusive to one qualifying product and/or qualifying product identification and all corresponding rule change events (e.g., use cases) for the qualifying product and/or qualifying product identification. In a number of embodiments, each of the topology domains can be non-exclusive to one qualifying product and/or qualifying product identification and all corresponding rule change events (e.g., use cases) for the qualifying product and/or qualifying product identification.

In some embodiments, system 300 also can include other topology domain systems, such as topology domain system_2 322-2, topology domain system_3 322-3, and/or topology domain system_n 322-n, and each of the topology domain systems can perform the similar functions as topology domain system_1 322-1, as described above. In some embodiments, the one or more topology domain systems can receive data from a rule change event and/or a use case for a qualifying product and/or qualifying product identification from journal database 332 before performing batching (e.g., a batch operation) and/or activating the rules to add, delete, and or update. In a number of embodiments, the one or more topology domain systems can store the results after performing the batching and/or activating for a qualifying product and/or qualifying product identification in store database 333.

Turning to FIG. 7, illustrates multiple diagrams 700 for a more detailed view for activity 407 (FIG. 4) of determining, by the receiver, a first use case of one or more use cases based on the old rule minus the new rule.

In a number of embodiments, multiple diagrams 700 can include a diagram 710 illustrating use case one in greater detail. In many embodiments, all the product identifications from Rnew can be assigned to R2D2s with a "weight" of the rule expression. In some embodiments, diagram 710 can be visually illustrated by a portion 711 that can depict use case one with Rnew in a single circle as a result of Rold minus Rnew. In many embodiments, use case one can be explained in greater detail above in Tables 5-7 and FIGS. 8 and 9 below.

In some embodiments, multiple diagrams 700 can include a diagram 720 illustrating use case two in greater detail. In some embodiments, diagram 720 can be visually illustrated by a portion 721 depicting Rnew as the outer circumference of a circle and a portion 722 as a smaller inner circle within Rnew, where the effect of use case two can be Rold as expanded and/or covered by Rnew. In many embodiments, this is a use case of an existing rule Rold which was modified by Rnew to become a superset of Rold. In many embodiments, use case two can be explained above in greater detail above in Tables 8-10 and FIGS. 8 and 9 below.

In several embodiments, multiple diagrams 700 can include a diagram 730 illustrating use case three in greater detail. In some embodiments, diagram 730 can be visually illustrated by a portion 732 depicting Rold as the outer circumference of a circle and a portion 731 of Rnew as the inner smaller circle of use case three depicting a deletion of Rold and Rnew has not changed Rold. In some embodiments, this is a use case of an existing Rold which was modified by Rnew resulting in a subset of Rold. In many embodiments, use case three can be explained above in greater detail above in Tables 11-13 and FIGS. 8 and 9 below.

In many embodiments, multiple diagrams 700 can include a diagram 740 illustrating use case four in greater detail. In some embodiments, diagram 740 can be visually illustrated by a portion 742 depicting an Rold as a separate circle and a portion 741 as another separate circle independent of Rold. In several embodiments, this can be a use case of an existing Rold which can be modified by Rnew and can lead to two different set of product identifications for both Rold and Rnew. In several embodiments, Rnew was assigned and/or updated to respective product identifications. In a number of embodiments, Rold was deleted from respective product identifications. In many embodiments, use case five can be explained in greater detail above in Tables 14-16 and FIGS. 8 and 9 below In several embodiments, multiple diagrams 700 can include a diagram 750 illustrating use case five in greater detail. In many embodiments, diagram 750 can be visually illustrated by a portion 752 of Rold overlapping with a portion 751 of Rnew, with an intersection area of a portion 753 indicating that only a part of Rold is deleted and that Rnew can be updated with respective product identifications with part of Rold. In some embodiments, this is a use case of an existing rule Rold partially modified by Rnew, leading to the overlapping circles. In many embodiments, use case five can be explained in greater detail above in Tables 17-19 and FIGS. 8 and 9 below.

Figure 8:
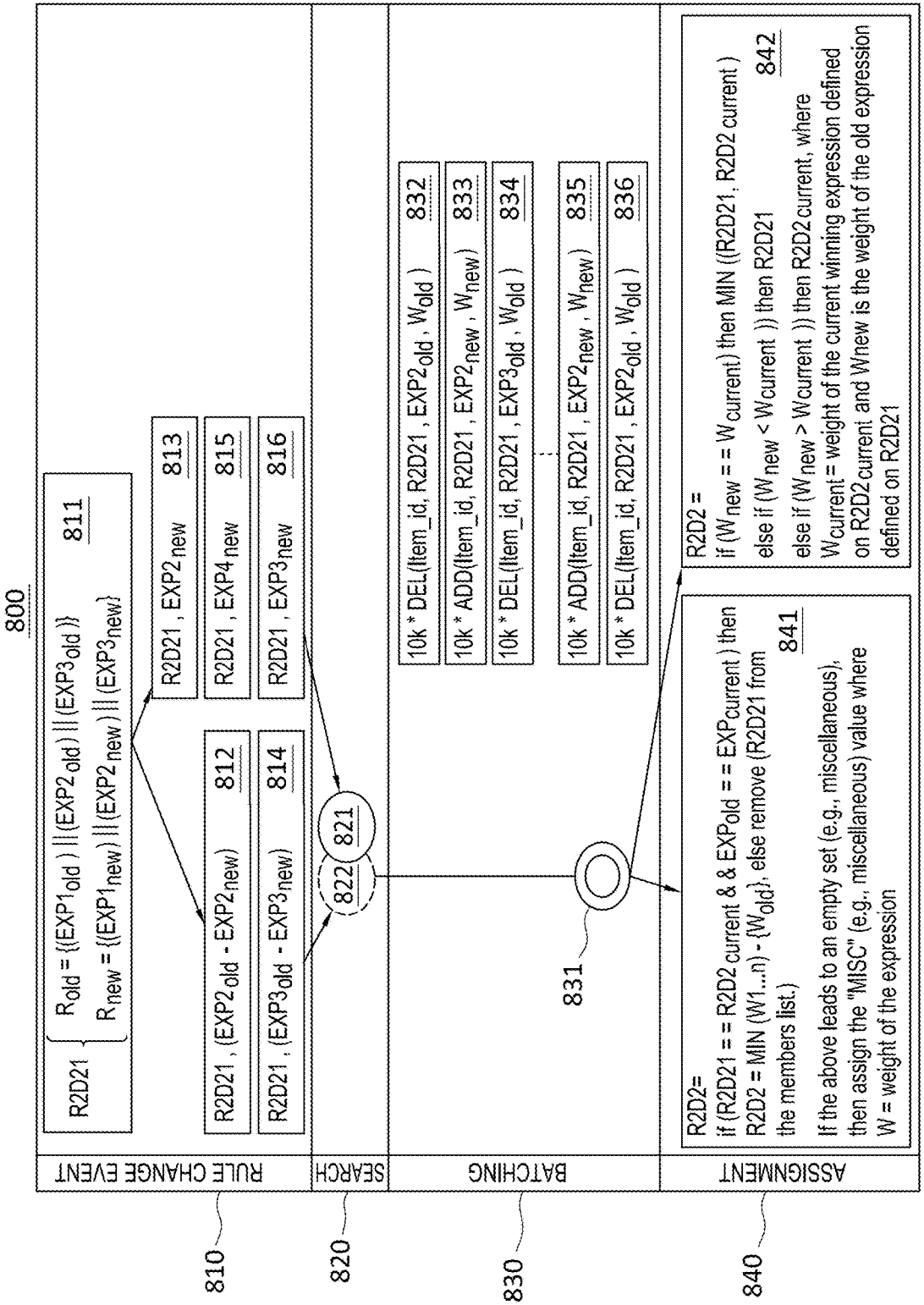
FIG. 8 illustrates a flow diagram according to another embodiment.

In FIG. 8, illustrates a simplified example of a flow diagram for an activity 800 of a rule change event processed and/or analyzed using an ecosystem of a new platform, such as ecosystem 305 (FIGS. 3 and 6). In several embodiments, activity 800 can include a rule change event 810, a search 820, batching 830, and/or an assignment 840. For example, a catalog, such as content catalog 395 (FIGS. 3 and 6), can organize and/or store approximately fifty million (50,000,000) products or more at any given time. In another example, a web server, such as web server 360 (FIGS. 3 and 6), can send requests (e.g., API call) to a content catalog, such as content catalog 395 (FIGS. 3 and 6) for product information for one or more products. In many embodiments, a web server, such as web server 360 (FIGS. 3 and 6) can display and/or organize the product information based on a rule change event and/or derived attributes and derived attribute values associated with a product. In some embodiments, a rule change event processed by ecosystem 305 (FIGS. 3 and 6), can result in deleting, adding, and/or updating a set of derived attributes with multiple rule expressions of each derived attribute. In several embodiments, a rule change event processed by ecosystem 305, can result in two commands to be activated concurrently, such as, commands to delete, add, and/or update a derived attribute value and more than one rule expressions.

In several embodiments the activities of activity 800 can be performed concurrently using another process and/or thread with other activities of activity 800, such as activities 810, 820, 830, and 840. In a number of embodiments, activity 810 of rule change events can be performed concurrently with other rule change events, such as 811, 812, 813, 814, 815, and/or 816, and vice versa. In some embodiments, activity 820 of searching a content catalog for one or more products matching Rold, (e.g., old and/or existing rules), such as content catalog 395, and can be performed concurrently with activities 821 and/or 822. In many embodiments, activity 830 of batching and/or activating the rule change events can include activity 831 of organizing rule change events with populations and/or group of products, such as 821, 822, and can activate the rule change events concurrently during a predetermined period of time, such as is illustrated in simplified examples of activities 832, 833, 834, 835, and 836. In several embodiments, activity 840 of assignments can assign the rule change event commands to the products matching the rule change event, such as delete assignment 841 and add assignment 842. In various embodiments, activity 840 of assignments can assign an attribute value to a product based on a weight of the attribute value expression, where the lowest weight for an attribute value among other attribute values in a members list for a product becomes the "winning value." In many embodiments when activity 840 assigns a "winning value" to product information of a product, the product information can be updated and/or modified according to the derived attribute value of the winning value in the content catalog, such as content catalog 395 (FIGS. 3 and 6).

Rule Change Event

In many embodiments, activity 800 can include activity 810 of a rule change event of an activity where a rule from a rules engine can be sent to receiver 310 (FIGS. 3 and 6), where receiver 310 can determine a rule change event and perform a search for all of the qualifying products that can require a change and/or update to product information in a content catalog based on the rule change event. In some embodiments, activity 810 of a rule change event can include such activities as 811, 812, 813, 814, 815, and/or 816. In some embodiments, a rule event can impact product information of a qualifying product by activating one or more commands, such as, a delete command, an add command, and/or an update command. In several embodiments, an update command can be an add command applied to an existing rule and/or rule expression for a derived attribute value (e.g., rule expression listed in the members list for a derived attribute value). In several embodiments, a rule change event on a rule can mean that the expression of the rule can be added, deleted, and/or modified (e.g., updated).

In some embodiments, activity 800 can include activity 810 of a rule change event. In many embodiments, Rnew is received by rules engine 360 (FIGS. 3 and 6) wherein Rold minus Rnew creates a rule change event that may impact the product information of one or more products stored and/or maintained in content catalog 395 (FIGS. 3 and 6). In a number of embodiments, activity 810 can include activity 811 of depicting a simplified example of an old or existing rule (Rold) minus new rule (Rnew), illustrated as "Rold minus Rnew" that can determine which of the rule expressions pertaining to an attribute value can be added or deleted and which products in the content catalog 395 (FIGS. 3 and 6) store and/or retain the old and/or existing rule expression as an existing member in a members list. Such an example of a rule change event can be described as a use case (e.g., one of five use cases described above) as illustrated in a simplified format such as:

$$R2D21 \begin{cases} Rold = \{(EXP1old)\|(EXP2\ old)\|(EXP3\ old)\} \\ Rnew = \{(EXP1new)\|(EXP2\ new)\|(EXP3\ new)\} \end{cases} \quad 811$$

Where R2D21 is a derived attribute value, Rold, is an old and/or an existing rule comprising old rule expressions, {(EXP1old)||(EXP2 old|(EXP3 old)} represent Rold rule expressions such as EXP1old, EXP2old, and/or EXP3old, Rnew is a new rule comprising new rule expressions, {(EXP1new)||(EXP2 new||(EXP3 new)}, represent Rnew rule expressions such as EXP1new, EXP2new, and/or EXP3 new.

As a simplified example using exemplary data information for activity 811, a derived attribute value can equal a Laptop, such as, R2D21=Laptop. In many embodiments of activity 811, as an example, Rold and Rnew can operate as part of the change event. For example, activity 811 can be expressed as:

Rold=exp 1 old=product type is Laptop Computers||exp 2 old=brand is Dell or HP||exp 3 old=laptop type is 2 in 1 laptop.

Rnew=exp 1 new=product_type is Laptop Computers-‖exp 2 new=brand is Dell‖exp 3 new=laptop type is 2 in 1 laptop or Smart Laptop.

In many embodiments, rules can be maintained at a derived attribute value level. For example, a derived attribute value can also have a reporting hierarchy identification number (RHID), such as for a derived attribute value of Laptops. Referring to a simplified example, rules can be defined on Laptops and can consist of one or more expressions defining a rule on Laptops such as: EXP1: product type is "Laptop Computers" and EXP2: brand is "Dell," where EXP1 is an expression for the rule for a derived attribute and EXP2 is another expression for the rule for the derived attribute. In this example, a rule change event on this rule can indicate that the expression (e.g., EXP1, EXP2) can either be to delete, add and/or update (e.g., modified) product information of a product.

In several embodiments, activity 810 of rule change events can include an ADD event, a DELETE event, and/or an UPDATE event that can dictate which product information of one or more products that has Rold as a member in a members list can be affected by the rule change event, as further described above in activity 407 (FIG. 4).

In several embodiments, activity 810 can include activities 812 and 814 of describing a DELETE event. In many embodiments, a DELETE event can be performed when an existing rule expression can be changed to include fewer rule expressions, as further described above in activity 407 (FIG. 4). In various embodiments a DELETE event of activity 810 can occur where either the new rule (Rnew) is a subset of an old rule (Rold) and/or the new rule is completely different from the old rule and/or the new rule intersects with the old rule. In some embodiments, a DELETE event can occur in some use cases, such as use case three, use case four, and use case five, as discussed in greater detail above, as further described above in activity 407 (FIG. 4). In a number of embodiments, activity 812 can be expressed as: R2D21, (EXP2old–EXP2new). In several of embodiments, activity 814 can be expressed as: R2D21, (EXP3old–EXP3new).

In some embodiments, activity 810 can include activities 813, 815, 816 of describing an ADD event. In several embodiments, an ADD event can be performed when a new rule is defined using a derived attribute value and/or using an existing rule expression and the rule can be changed to include more rule expressions than the old rule before (e.g., Rold), as further described above in activity 407 (FIG. 4). In many embodiments an ADD event can occur in all five use cases dependent on the extent of the rule change events.

In some embodiments, activity 810 can include activities of 813, 815, 816 of describing exemplary scenarios when an ADD event can be performed, such as, when a new rule is defined and there is no existing old rule, such as in use case one, the derived attribute value can be added to the members list of all products that qualify for the new rule, as further described above in activity 407 (FIG. 4). In a number of embodiments, activity 813 can be expressed as: R2D21, EXP2new. In some embodiments, activity 815 can be expressed as: R2D21, EXP4new. In several embodiments, activity 816 can be expressed as: R2D21, EXP3new.

In several embodiments, activity 810 can include activities of 813, 815, 816 of describing exemplary scenarios when an ADD event can be performed, such as, when a new rule is a superset of an old rule, such as in use case two, the derived attribute value can be added to the members list of all products that qualify for the new rule, as further described above in activity 407 (FIG. 4).

In some embodiments, activity 810 can include activities of 813, 815, 816 of describing exemplary scenarios when an ADD event can be performed, such as, when a new rule is a subset of an old rule, such as in use case three, the derived attribute value can be added to the members list of all products that qualify for the new rule, as further described above in activity 407 (FIG. 4).

In some embodiments, activity 810 can include activities of 813, 815, 816 of describing exemplary scenarios when an ADD event can be performed, such as, when a new rule is completely different from the old rule, such as in use case four, the derived attribute value can be added to the members list of all products that qualify for the new rule, as further described above in activity 407 (FIG. 4).

In some embodiments, activity 810 can include activities of 813, 815, 816 of describing exemplary scenarios when an ADD event can be performed, such as, when a new rule intersects with an old rule, such as in use case five, the derived attribute value can be added to the members list of all products that qualify for the new rule, as further described above in activity 407 (FIG. 4).

Search

In some embodiments, activity 800 can include search 820 of searching a catalog, such as content catalog 395 (FIGS. 3 and 6), for qualifying products and/or product identifications that contain derived attributes and/or derived attribute values in the product data. In many embodiments, search 820 can include searching the content catalog using a separate and/or different thread and/or process using a derived attribute value for the "n" number of qualifying products with the derived attribute value as a member of a members list, as described in greater detail above.

In a number of embodiments, the search results of search 820, can yield and/or result in an "n" number of qualifying products and/or qualifying items for which a delete command of a derived attribute value and rule expression and/or rule expressions can be performed and/or activated, as described in greater detail below. In several embodiments the search results of search 820, can be stored and/or collected in more than one databases and/or memory caches, such as one database collecting all delete commands and/or one database collecting all add commands, such as database 822, and/or database 821. For example, a search result for Rold received 100 qualifying products which have been assigned a derived value for derived attribute R2D2, such as LAPTOPS. In another example, a search result for Rnew received 90 qualifying products, wherein all qualifying products and/or items which no longer qualify because the Rule excluded them as part of EXP 2 new, R2D2=LAPTOP can be removed. In some embodiments, examples of a delete event can include example equations, such as, activity 832, 834, 836.

Batching

In many embodiments, activity 800 can include activity 830 of batching and/or identifying one or more qualifying products and/or qualifying product identifications that can be returned from a search of the catalog after the occurrence of such a rule change event. In some embodiments, activity 830 of batching can include such exemplary batch equations such as 832, 833, 834, 835, and 836.

TABLE 20

Acting on the Rule by Batching

| | |
|---|---|
| 832 | 10k* DEL (Item_id, R2D21, EXP2old, Wold) |
| 833 | 10k* ADD (Item_id, R2D21, EXP2new, Wnew) |

TABLE 20-continued

Acting on the Rule by Batching

| | |
|---|---|
| 834 | 10k* DEL (Item_id, R2D21, EXP3old, Wold) |
| 835 | 10k* ADD (Item_id, R2D21, EXP2new, Wnew) |
| 836 | 10k* DEL (Item_id, R2D21, EXP2old, Wold) |

In Table 20, above, illustrates simplified examples of equations for a delete command, such as 832, 834, and 836, and an add command, such as, 833, and 835.

In a number of embodiments simplified examples of batching use cases can be performed in activity 830, of batching an "n" number of use cases as depicted in activities 832, 833, 834, 835, and/or 836. In many embodiments, activity 830 also can include activity 831 of batching use cases concurrently. For example, activity 832 can be configured to batch 10,000 use cases at a time based on DEL(Item_id, R2D21, EXP2old, Wold), while activity 833 can be configured to concurrently batch another 10,000 use cases based on ADD (Item_id, R2D21, EXP2new, Wnew), and similarly with activities 834, 835, and 836. In several embodiments, activity 831 can include the operation of batching approximately 10,000 use cases at the same time. In some embodiments, an "n" percentage of product identifications can be impacted by the current use case. In many embodiments, an "n" number of use cases can be batched at once, such as batching exemplary batches in activity 830.

Assignment

In several embodiments, activity 800 can include activity 840 of assigning a use case with a command to delete and/or remove when a search of content source 370 (FIGS. 3 and 6) yields an empty set of product identifications, when in that case, an attribute value, such as R2D21, can be removed from the list of rules matching product attribute value R2D21. In many embodiments, activity 840, as processed with these simplified numerical examples can result in two outcomes, either a command to delete, such as activity 841 and/or a command to add, such as by activity 842.

In some embodiments, activity 840 can include activity 841 of illustrating a simplified example of a delete event and/or command. In a number of embodiments, activity 841 can be a simplified example of a derived attribute value and rule expression, such as <R2D22:RE7:0.01>, that exists as a member in a members list for a qualifying product, as depicted in Table 21, below. In many embodiments, when there is no change in the derived attribute value and when there is no change in the rule, such as when EXPold "is equal to" EXPnew (e.g., EXPold==EXPnew), where under this condition, the derived attribute, such derived attribute value R2D21 can be deleted and/or removed, as depicted in Table 22, below.

TABLE 21

Before a Delete Event

| Item_id | R2D2 | exp | weight | members list |
|---|---|---|---|---|
| 123 | R2D22 | RE7 | 0.01 | <R2D22 : RE7 : 0.01><br><R2D23 : RE3 : 0.02><br><R2D21 : RE2 : 0.08> |
| 234 | R2D23 | RE3 | 0.002 | <R2D23 : RE5 : 0.002><br><R2D22 : RE7 : 0.01><br><R2D21 : RE2 : 0.08> |
| 345 | R2D21 | RE7 | 0.01 | <R2D22 : RE7 : 0.01> |

In this simplified example, Table 21, above, can include exemplary data tracked for a group of qualifying products at any given period of time before a Delete event can be activated and/or performed. In some embodiments, Table 21 can illustrate a group of exemplary data, such as, qualifying products (e.g., Item_id), a derived attribute (e.g., R2D2), a derived attribute value (e.g, R2D21, R2D22, R2D23), an rule (e.g., exp), a weight for a rule and rule expression (e.g., weight), and members (e.g., <R2D22:RE7:0.01>; <R2D23:RE5:0.002>; <R2D23:RE3:0.02>; <R2D21:RE2:0.08>) of a members list for products with derived attribute values and rule expressions, such as has been described in greater detail above.

TABLE 22

After a Delete Event

| Item_id | R2D2 | exp | weight | members |
|---|---|---|---|---|
| 123 | R2D22 | RE3 | 0.02 | <R2D23 : RE3 : 0.02><br><R2D21 : RE2 : 0.08> |
| 234 | R2D23 | RE5 | 0.002 | <R2D23 : RE5 : 0.002><br><R2D21 : RE2 : 0.08> |
| 345 | MISC | NA | NA | |

In this simplified example, Table 22, above, can include exemplary data tracked for a group of qualifying products at any given period of time after activation and/or performance of a Delete Event. In some embodiments, Table 22 can illustrate a group of exemplary data, such as, qualifying products (e.g., Item_id), a derived attribute (e.g., R2D2), a derived attribute value (e.g., R2D22, R2D23), an rule (e.g., exp), a weight for a rule and rule expression (e.g., weight), and members (e.g., <R2D21:RE2:0.08>; <R2D23:RE5: 0.002>; <R2D23:RE3: 0.02>) on a members list for products with derived attribute values and rule expressions, such as has been described in greater detail above.

In many embodiments, activity 841 can be expressed as a condition that can result in a Delete event when the condition is satisfied. In a number of embodiments, activity 841 of the derived attribute, such as R2D21 and rule expressions, where the expressions can be deleted and/or removed from the members list of the product, as described below.

In a number of embodiments, activity 841 can be expressed as:

$$R2D2 =$$
$$\text{if } (R2D21 == R2D2 \text{ current } \&\& \text{ EXPold} == \text{EXPcurrent}) \text{ then } R2D2 =$$
$$\text{MIN}(W1 \ldots n) - \{Wold\},$$
$$\text{else remove}(R2D21 \text{ from the members list.})$$

If the above leads to an empty set (e.g., miscellaneous), then assign the "MISC" (e.g., miscellaneous) value where W=weight of the expression.

If the above leads to an empty set (e.g., miscellaneous), such as when R2D21 is the only derived attribute and expression in the members list, then assign the term "MISC" (e.g., miscellaneous) for a null value where W=weight of the expression.

Where R2D2 is a derived attribute, and "R2D21" is the derived attribute value on which the rule change event occurred resulting in a Delete event. Where R2D2current is the current "winning" derived attribute value and EXPcurrent is the rule expression defined on R2D2current, EXPold is the rule expression defined on R2D21, and MIN (W1 . . . n)-Wold is the minimum weight of all derived attribute values and rule expressions, excluding the derived attribute value to be deleted, and MISC is a derived attribute value that can be assigned in place of a winning value when a member can be deleted from the members list and/or when a rule change event results in an empty set.

As an example, R2D22 can be a derived attribute value and <RE7:0.01> can be a rule expression to be deleted from the members list of certain qualifying product identifications (e.g., Item_id) such as, 123, 234 and 345. In this example, the "if" condition for qualifying product, such as 123, in the above equation, is satisfied and has become the "winning value," therefore, in this example, derived attribute value, R2D22, is equal to the current derived attribute value to be deleted (e.g., R2D22) and <RE7:0.01> is the winning rule expression which is equal to the current rule expression <RE7:0.01>.

As another example, since product 123 (e.g., Item_id 123) has other competing derived attribute values and rule expressions in its members list, such as R2D21 and R2D23, an analysis can be performed to derive the lowest winning value (e.g., weight of the expression) of all of the derived attributes in the members list, therefore by excluding R2D22 which is to be deleted and by picking the one of the remaining derived attribute values with a minimum weight among the members, such as, R2D21 and R2D23, the next "winning" value is selected. Therefore, as part of this example, product 123 (e.g., Item_id 123), R2D23 and <RE3: 0.02> will be the new winner as it has the least weight after deleting R2D22 and <RE7:0.01> from the member list. Similarly, for item 234, the "else clause" can be satisfied since its winning derived attribute value, such as R2D23, is not equal to the current derived attribute value to be deleted, such as R2D22, and <RE3:0.02> is the winning rule expression which is not equal to the current rule expression <RE7:0.01> and R2D22 and <RE7:0.01> can be deleted from the members list. In this example, for item 345, the members list has only R2D22 and <RE7:0.01> remaining, which is the derived value to be deleted, and upon deleting the derived value, R2D22 can result in an empty member list, therefore, in this example, a MISC value can be assigned as the winning value.

In many embodiments, a "winning value" can be computed by evaluating the weight of the rule. For example, a derived attribute value and a rule expression for a qualifying product and/or qualifying product identification can be assigned as the "winning value" when the rule expression based on the derived attribute value has the smallest and/or minimum weight among all the other derived attribute values and rule expressions in a members list for the qualifying product.

In some embodiments, activity 840 can include activity 842 of illustrating a simplified example of an add event and/or command. In some embodiments, activity 840 can include activity 842 of describing a rule change event that results in an assignment of a derived attribute value, if the weight of the current expression is equal to that of the new one, then the minimum weight of the two derived values in a members list can be the winning value. In an example where the weight of the new expression is less than that of the current expression, the newly computed assignment can be the winning value and when the weight of the new expression is greater than that of the current expression the current expression and/or assignment can be the winning value. In many embodiments, method 800 can include activity 840 of assigning Rold and/or Rnew with a command to delete, add, or update based on activity 841 and 842.

TABLE 23

Before an Add Event

| Item_id | R2D2 | exp | weight | Members |
|---|---|---|---|---|
| 123 | R2D22 | RE7 | 0.01 | <R2D22(1220): RE7: 0.01><br><R2D23(1221): RE3: 0.02><br><R2D21(1222): RE2: 0.08> |
| 234 | R2D23 | RE5 | 0.02 | <R2D23(1221): RE5: 0.02><br><R2D21(1222): RE2: 0.08> |
| 345 | R2D22 | RE5 | 0.005 | <R2D22(1220): RE5: 0.005><br><R2D21(1222): RE2: 0.08> |

In this simplified example, Table 23, above, can include exemplary data tracked for a group of qualifying products at any given period of time before an Add event can be activated and/or performed. In some embodiments, Table 21 can illustrate a group of exemplary data, such as, a group of qualifying products (e.g., Item_id), a derived attribute (e.g., R2D2), a derived attribute value (e.g., R2D21, R2D22, R2D23), a rule (e.g., exp), a weight for a rule and rule expression (e.g., weight), and members (e.g., <R2D22 (1220):RE7:0.01>; <R2D23(1221): RE5:0.02>; <R2D23 (1221):RE3:0.02>; <R2D21(1222):RE2:0.08>) of a members list for products with derived attribute values and rule expressions, such as has been described in greater detail above.

TABLE 24

After an Add Event

| Item_id | R2D2 | exp | weight | Members |
|---|---|---|---|---|
| 123 | R2D22 | RE7 | 0.01 | <R2D22(1220): RE7: 0.01><br><R2D23(1221): RE3: 0.02><br><R2D21(1222): RE2: 0.08><br><R2D25(1234): RE5: 0.01> |
| 234 | R2D25 | RE5 | 0.01 | <R2D23(1221): RE5: 0.02><br><R2D21(1222): RE2: 0.08><br><R2D25(1234): RE5: 0.01> |
| 345 | R2D22 | RE5 | 0.005 | <R2D22(1220): RE5: 0.005><br><R2D21(1222): RE2: 0.08><br><R2D25(1234): RE5: 0.01> |

In this simplified example, Table 24, above, can include exemplary data tracked for a group of qualifying products at any given period of time after activation and/or performance of an Add event. In some embodiments of examples, Table 24 can illustrate a group of exemplary data, such as, a group of qualifying products (e.g., Item_id), a derived attribute (e.g., R2D2), a derived attribute value (e.g., R2D21, R2D22, R2D23), a rule (e.g., exp), a weight for a rule and rule expression (e.g., weight), and members (e.g., <R2D22 (1220):RE7:0.01>; <R2D23(1221):RE5:0.02>; <R2D23 (1221):RE3:0.02>; <R2D21(1222): RE2:0.08>) of a members list for products with derived attribute values and rule expressions, such as has been described in greater detail above.

In several embodiments, activity 842 can be expressed as can be expressed as a condition that can result in an Add event when the condition is satisfied. In a number of embodiments, the derived attribute, such as R2D21 and rule expressions, will be added to the members list of the product and of the remaining weights of the expressions for the derived attributes, the lowest and/or minimum weight can become a winning value, as described below.

In a number of embodiments, activity 842 can be expressed as:

R2D2=
if (Wnew==Wcurrent) then MIN ((R2D21, R2D2 current)
else if (Wnew<Wcurrent)) then R2D21
else if (Wnew>Wcurrent)) then R2D2current, where Wcurrent=weight of the current winning expression defined on R2D2current and
Wnew is the weight of the old expression defined on R2D21.

Figure 9:
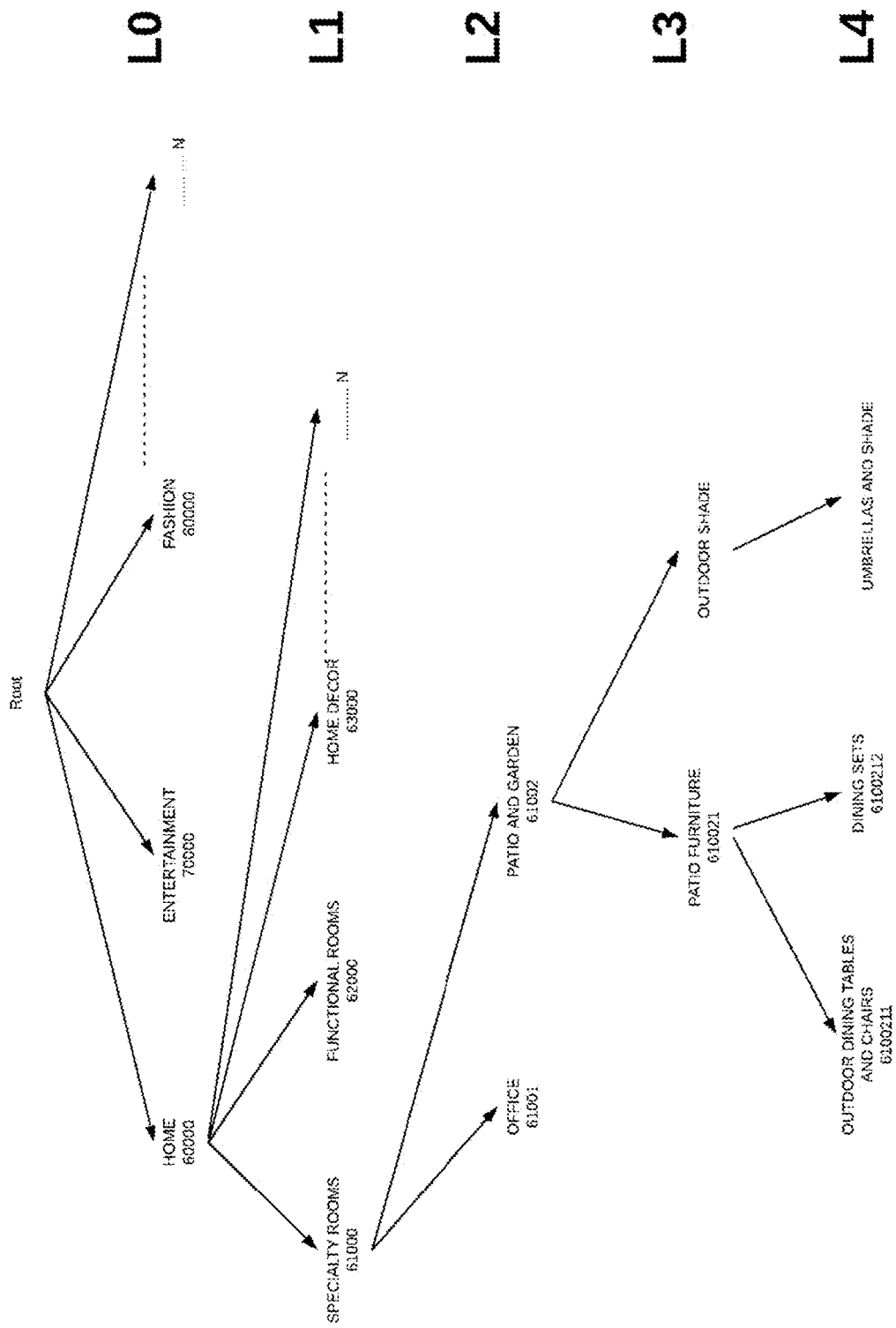
FIG. 9 illustrates a flow diagram according to another embodiment.

Where, R2D2 is the derived attribute, R2D2current is the current winning derived attribute value, Wcurrent is the weight of rule expression defined on R2D2current, R2D21 is the derived attribute value that is received as part of the rule change event that resulted in Add event and Wnew is a weight of the new rule expression defined on R2D21 and MIN ((R2D21, R2D2 current) can be taking minimum of R2D21 and R2D2 current, as described in greater detail in FIG. 9 for R2D21 and R2D2 current.

When the weights of the rule expressions are the same, the identification numbers of the derived attribute values can be compared and the minimum can be chosen as a winner, where R2D25 is the derived attribute value and (1234) can be the identification number of the derived attribute value.

As an example, let R2D25 (1234):RE5:0.01 be the derived attribute value with a corresponding rule expression that can be added to the members list all for products (e.g., items) 123, 234 and 345, where the expression weight of RE5 can be 0.01 (e.g., RE5 0.01), and where the derived attribute value R2D25 has an identification number, (1234). In this example, the current members list for these items and the winning value is shown in Table 24 above. Additionally, in this example, all products (e.g., items) can now qualify as part of a new expression, EXP3new, which can include Smart Laptops, where R2D2=LAPTOP is added (e.g., activities 833 and 835) as the derived attribute. After a new R2D2 is added to a product (e.g, item), a winning R2D2 can be computed as follows:

If (weight of current expression==weight of old expression), then R2D2 of the min (R2D2, R2D2 current).

In Table 24 above, for product 123 the weight of the winning expression can be equal to the weight of the current expression, such as expression weight 0.01. In this example, a winner can be computed based on the identification number of the derived attribute value by picking the minimum of the two weights as the winner. In the above example, item 123, R2D22 has an identification number of (1220), such as <R2D22(1220):RE7:0.01>, and R2D25 has an identification number of (1234), such as <R2D225(1234): RE5: 0.01>, therefore, the winner can be R2D22 (1220) since it is the minimum R2D22 (1220) and R2D225(1234).

If (weight of current expression <weight of old expression)=R2D2 current.

In the above example, for item 234, the weight of R2D25 and RE 3 is 0.01 which is less than the weight of the old expression <R2D23(1221): RE5: 0.02> which is expression weight 0.02. Hence R2D25 becomes the winner. If (weight of current expression>weight of old expression)=R2D2 old. In the above example, for item 345, the weight of the current incoming expression on R2D25 and <R2D23(1221): RE5: 0.02> which is 0.01 is greater than the weight of the old expression on R2D22 and <R2D23(1221): RE5: 0.02> which is 0.005, therefore R2D22 can become the winner.

After a new R2D2 is added to an item, the winning R2D2 is computed as follows:

If (weight of new expression==weight of current expression), then R2D2 of the min (R2D2, R2D2 current).
If (weight of new expression<weight of current expression)=R2D2 new.
If (weight of new expression>weight of current expression)=R2D2 current.

FIG. 9, illustrates a report hierarchy tree diagram for an activity 900 of describing a reporting hierarchy identification number (RHID). In several embodiments, the tree diagram begins and/or starts with a root node and can have several levels of hierarchy including L0, L1, L2, L3 and L4, where the several levels can represent different levels of product categories and/or sub-categories. In a number of embodiments, the tree diagram can have leaf nodes such as level 4 (e.g., L4) that can represent derived attribute values for products. In some embodiments, a report hierarchy tree diagram can represent the products and/or product identifications of a content catalog in a hierarchical manner, such as content catalog 395 (FIGS. 3 and 6). In many embodiments, a report hierarchy tree diagram can be used for generating internal reports based on categories and/or sub-categories (e.g., L0, L1, L2, and L3). In several embodiments, rules can be defined on leaf nodes, such as level 4 (e.g., L4), of a reporting hierarchy tree where rules can be made up of one or more rule expressions and in turn the rule expressions can define some of the derived attribute values of a product.

In some embodiments, a derived attribute value can have an identification number (ID) and/or a number associated with it that also can be used as an identifier. For example, in FIG. 9, "Dining Sets" can be a derived attribute value and the number "6100212" can be the product ID and/or product identifier as shown on this exemplary report hierarchy tree diagram. In many embodiments, rules can be maintained and/or managed at the derived attribute value level where a rule change event can determine whether the derived attribute value can be either added, deleted, and/or modified in the content catalog and as used below in several simplified examples.

Referring to FIG. 9, of a simplified example based on a reporting hierarchy tree for use case one, of adding a new rule to a qualifying product, can be illustrated in greater detail below:

As an example, a derived attribute, such as R2D2, can have a derived attribute value, such as R2D21 that can be equal to "Dinning Sets" (6100212) (e.g., RHID number), as shown on level 4 (e.g., L4) of FIG. 9. In this example, an old rule, Rold, can be null (does not exist) and a new rule, Rnew, can have two rule expressions, such as, EXP1—Product type EQ Dining Furniture Sets and EXP 2—Brand EQ "Mainstays." In following with this example, Rnew and the two rule expressions would be added to the product attribute value of the product, and if Rnew becomes a "winning" value for the product, Rnew will also be updated in a content catalog.

Similarly as describe above, a search (e.g., scan) of a content catalog, such as content catalog 395 (FIGS. 3 and 6), can be performed for Rnew to identify a population and/or group of qualifying products and/or qualifying product identifications. A search for Rold will not be performed as it is null and/or is not affected by Rnew. As part of this simplified example, the search can identify "k" number of qualifying products and/or qualifying product identifications. In this simplified example, for all "k" number of qualifying products, each population can be processed in parallel batches of approximately 10k (10,000) and/or more qualifying products on separate threads and/or separate processes from a main pipeline. In this simplified example, since use case one can be a new rule, "Dinning Sets" can be an added (e.g., Add event) to derived attribute R2D2 as a derived attribute value, such as R2D21, for each of the "k" number of qualifying products. As part of this simplified example of use case one, the derived attribute value, such as R2D21 and "Dinning Sets," can be added to the members list for all qualifying products and/or product identifications.

Referring to FIG. 9, of a simplified example based on a reporting hierarchy tree for use case two, of when the a new rule can become a superset of an old rule (e.g., superset Rnew), can be illustrated in greater detail below:

In this example, a derived attribute value, R2D2, can be assigned a derived attribute value, such as R2D21 that can be equal to "DINING SETS" (6100212) (e.g., RHID number), where in this example, Rold can have two old rule expressions such as: Exp 1—Product type EQ 'Dining Furniture Sets' and Exp 2—Brand EQ 'Mainstays' and Rnew can have one new rule expression: Exp1—Product type EQ 'Dining Furniture Sets'. In following with this example, Rnew and the two rule expressions would be added to Rold to form a superset of Rnew as a derived attribute value of the product, and if superset Rnew becomes a "winning" value for the product, superset Rnew will also be updated in a content catalog.

Similarly as described above, a search (e.g., scan) of a content catalog, such as content catalog 395 (FIGS. 3 and 6), can be performed for each Rold and Rnew to identify a population and/or group of qualifying products and/or qualifying product identifications for each Rold and Rnew. As part of this simplified example, the search can identify for Rold "k" number of qualifying products and/or qualifying product identifications for each Rold and can identify for Rnew "m" number of qualifying products and/or qualifying product identifications. In this simplified example, use case two can be a new rule of "k+m" of a super set of Rnew and Rold. As part of this simplified example, for all "m" numbers of qualifying products, each population can be processed in parallel batches of approximately 10,000 qualifying products on separate threads and/or separate processes from a main pipeline. As part of this simplified example of use case two, the R2D21 attribute value, such as 'DINING SETS' can be added to the qualifying products.

Turning to FIG. 9, of a simplified example based on a reporting hierarchy tree for use case three, of when a new rule can become a subset of an old rule (e.g., subset Rnew) by deleting and adding a rule expression, can be illustrated in greater detail below:

In this example, a derived attribute value, R2D2, and can be assigned a derived attribute value, such as R2D21 that can be equal to "DINING SETS" (6100212) (e.g., RHID number), where in this example, Rold can have one rule expression: EXP 1—Product type EQ 'Dining Furniture Sets' and Rnew can have two rule expressions: EXP 1—Product type EQ 'Dining Furniture Sets' and EXP 2—Brand EQ 'Mainstays. In following with this example, subset Rnew and the two rule expressions would be added to the product attribute value of the product, and if subset Rnew becomes a "winning" value for the product, subset Rnew will also be updated in a content catalog.

Similarly as described above, a search (e.g., scan) of a content catalog, such as content catalog 395 (FIGS. 3 and 6), can be performed for Rold and Rnew to identify a population and/or group of qualifying products and/or qualifying product identifications for each Rold and Rnew. As part of this simplified example, the search can identify for Rold "k" number of qualifying products and/or qualifying product identifications for each Rold and can identify for Rnew "m" number of qualifying products and/or qualifying product identifications. In this simplified example, use case three can be a new rule of "k−m", where "m" can be a subset of "k." As part of this simplified example, for all "m" number of qualifying products, an add is performed for each population can be processed in parallel batches of approximately 10k of qualifying products on separate threads and/or separate processes from a main pipeline. As part of this simplified example of use case three, for "k−m" qualifying products the R2D2 attribute value, such as 'DINING SETS', can be removed from the qualifying products.

In FIG. 9, of a simplified example based on a reporting hierarchy tree for use case four, of when a new rule can be completely different from an old rule by deleting and adding a rule expression to a qualifying product, can be illustrated in greater detail below:

For this example, a derived attribute value, R2D2, can be assigned an derived attribute value, such as R2D21 and can be equal to "DINING SETS" (6100212) (e.g., RHID number), where in this example, Rold can have one rule expression: Exp1—Product type EQ 'Dining Furniture Sets', and Rnew can have another rule expression=Exp1—Product type EQ 'Outdoor Dining.' In this simplified example, both Rold and Rnew can be disjointed or separate rules, where "k" can be the number of qualifying products impacted by Rold and "m" can be the number of qualifying products impacted by Rnew. In following with this example, Rnew and the other rule expression would be added to the product attribute value of the product, and if Rnew becomes a "winning" value for the product, Rnew will also be updated in a content catalog.

Similarly as described above, a search (e.g., scan) of a content catalog, such as content catalog 395 (FIGS. 3 and 6), can be performed for Rold and Rnew to identify a population and/or group of qualifying products and/or qualifying product identifications for each Rold and Rnew. As part of this simplified example, the search can identify for Rold "k" number of qualifying products and/or qualifying product identifications for each Rold and can identify for Rnew "m" number of qualifying products and/or qualifying product identifications. In this simplified example, use case four can be a new rule that is different for both populations of "k" and "m." As part of this simplified example, for all "m" number of qualifying products, an add is performed for each population can be processed in parallel batches of approximately 10k of qualifying products on separate threads and/or separate processes from a main pipeline. As part of this simplified example of use case three, for "k" qualifying products the R2D2 attribute value, such as 'DINING SETS', can be removed from the qualifying products. As part of this simplified example of use case three, for "m" qualifying products the R2D2 attribute value, such as 'DINING SETS', can be added to the qualifying products.

Referring to FIG. 9, of a simplified example based on a reporting hierarchy tree for use case five, of when a new rule can intersect with an old rule (e.g., intersection Rnew) by deleting and adding a rule expression, can be illustrated in greater detail below:

As an example, a derived attribute value, R2D2, can be assigned a derived attribute value, such as R2D21 and can be equal to "DINING SETS" (6100212) (e.g., RHID number), where in this example, Rold can have two rule expressions: EXP 1—Product type EQ 'Dining Furniture Sets' and EXP 2—Brand EQ 'Mainstays' and Rnew can have two rule expressions: EXP 1—Product type EQ 'Dining Furniture Sets' or 'Outdoor Dining' and EXP 2—Brand EQ 'Mainstays' or 'Better Homes.' In this simplified example of use case five, some of qualifying products can be impacted by Rold and still qualify for the Rnew. Additionally, for the intersection between Rold and Rnew, qualifying products can qualify for the Rnew. In following with this example, intersection Rnew, and the two rule expressions would be added to the product attribute value of the product, and if intersection Rnew becomes a "winning" value for the product, intersection Rnew will also be updated in a content catalog.

Similarly as described above, a search (e.g., scan) of a content catalog, such as content catalog 395 (FIGS. 3 and 6), can be performed for Rold and Rnew to identify a population and/or group of qualifying products and/or qualifying product identifications for each Rold and Rnew. As part of this simplified example, the search can identify for Rold "k" number of qualifying products and/or qualifying product identifications for each Rold and can identify for Rnew "m" number of qualifying products and/or qualifying product identifications. Further, the search can identify for the intersection of Rold and Rnew an "n" number of qualifying products and/or qualifying product identifications. In this simplified example, use case five can be a new rule to be added to both "m" and "n" and deleted for "k." As part of this simplified example, for all "m" and "n" number of qualifying products, an add is performed for each population can be processed in parallel batches of approximately 10k of qualifying products on separate threads and/or separate processes from a main pipeline. As part of this simplified example of use case five, for "k–n" qualifying products the R2D2 attribute value, such as 'DINING SETS', can be removed from the qualifying products.

Conventionally, all rule changes received from vendors and/or third parties were processed and/or executed as part of a daily job process using a main pipeline, such as an item set up pipeline, where as part of the process, the entire content catalog was scanned to identify products that were impacted by the rule changes to implement updates. Using the same platform, the main pipeline would then ingest and/or incorporate the updates to the products. In some embodiments, the daily job processing created an ongoing bottleneck effect along the same pipeline using up computer resources and processor capacities of the pipeline. Such a system of using the same platform effectively reduced the speed at which these changes and/or updates could be performed and/or reflected in the catalog. One advantage of using a reactive attribute management platform is segregating respective rule change events based on classifiers from the pipeline allowing the pipeline to remain lightweight and independent to run other computer processes. Another advantage of the new platform is that the reactive attribute management platform as a whole can process the updates faster due to the ecosystem process which can improve the speed of the computer processors to perform updates on certain isolated populations of qualifying products. Further, in some embodiments, the computer processing time for each rule change event and corresponding derived attribute values with rule expressions can be performed in near real time.

In many embodiments, the techniques described herein can provide several technological improvements. In some embodiments, the techniques described herein can provide for automatically determining a rule change event that can affect certain attributes of a product for display as expressed in a content catalog using a reactive attribute management platform. In a number of embodiments, the techniques described herein can provide for determining a rule change event that can affect certain attributes of a product for display as expressed in a content catalog using a reactive attribute management platform. In many embodiments, the techniques described herein can beneficially make determinations based on real-time information that describes current derived attributes for qualifying products. In a number of embodiments, the techniques described herein can advantageously enable efficient utilization of an ecosystem, such as 305 (FIGS. 3 and 6) by dynamically creating use cases that determine the impact a new rule can have on an old rule then linking the new rule to one or more qualifying products and qualifying product identifications of one or more products in real time when product information is received the users, such as users 350-351 (FIG. 3), which can beneficially result in a reduction in processor use and memory cache.

In a number of embodiments, the techniques described herein can advantageously provide a consistent user experience by dynamically updating product information with derived attributes for each item using a centralized ecosystem, such as ecosystem 305 (FIGS. 3 and 6) across different applications that query this information, such as product information, existing rules, etc. In various embodiments, the techniques described herein can dynamically determine whether to apply a rule change event to more than one product received by third-party vendors. For example, over two million product updates can be received from third-party vendors in one day. In some embodiments, the techniques provided herein can beneficially reduce computing resources and costs while continuing to offer real time updates based on rule change events for the products received each second, minute, and/or other suitable period of time in at least a day, a week, and/or other suitable periods of time. For example, a content catalog can include approximately one hundred million items and/or products at any given period of time. In some embodiments, experimental results have shown that the techniques described herein can process approximately one million (1,000,000) products and/or items in approximately each minute (e.g., 3600 seconds) and publish updates to the products and/or items to the content catalog in real time when using the react attribute management platform and the techniques and processes herein. In several embodiments, by contrast, older techniques that were used to process the same approximately one million (1,000,000) products and/or item could often take approximately three (3) hours and could only publish updates to the products and/or items to the content catalog approximately once a day to the content catalog due to an absence of a capability to react to rule changes in real time.

In many embodiments, the techniques described herein can be used continuously at a scale that cannot be handled using manual techniques. For example, the number of daily and/or monthly visits to the content source can exceed approximately ten million and/or other suitable numbers, the number of registered users to the content source can exceed approximately one million and/or other suitable numbers, and/or the number of products and/or items sold on the website can exceed approximately ten million (10,000,000) approximately each day.

In a number of embodiments, the techniques described herein can solve a technical problem that arises only within the realm of computer networks, as determining whether to update a product with certain derived attributes based on rule change events does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because a content catalog, such as an online catalog, that can power and/or feed an online website that is part of the techniques described herein would not exist.

Various embodiments can include a system including an ecosystem including one or more processors and one or more non-transitory computer-readable media storing computing instructions configured to run on the one or more processors and perform certain acts. The acts can include receiving, from a content source, product information for a product of one or more products. The acts also can include the product information that can comprise (a) core product data for the product and (b) a product identification for the product. The acts can include storing, in a store database, one or more derived attributes of the one or more products. The store database can include the one or more derived attributes that can be based at least on a respective use case of one or more uses cases that can affect the one or more products presented in a content catalog. The acts can include at least one of the one or more derived attributes that can affect at least the product of the one or more product. The acts can also include transmitting to a content feed and a topology system the product identification for the product. The acts can further include transmitting to the content feed the one or more derived attributes. The content feed can merge the at least one of the one or more derived attributes with the product information to update the product information in the content feed based on matching the product identification for the product with the one or more derived attributes such that the product information includes the core product data, the product identification, and the at least one of the one or more derived attributes. The acts can further include receiving, by a receiver and from a rules engine, a new rule affecting the product. The acts can include searching, by the receiver, the content catalog for the product identification for the product that matches the new rule. Further the acts can include determining, by the receiver, a first use case of one or more use cases based on an old rule minus the new rule. The acts can include storing, in the store database, the first use case as part of the at least one of the one or more derived attributes associated with the product identification.

A number of embodiments can include a method being implemented via execution of computing instructions configured to run at one or more processors and stored at one or more non-transitory computer-readable media. The method can include receiving, from a content source, product information for a product of one or more products, wherein the product information comprises (a) core product data for the product and (b) a product identification for the product. The method also can include storing in a store database one or more derived attributes of the one or more products in a store database. The one or more derived attributes are based at least on a respective use case of one or more uses cases that affects the one or more products presented in a content catalog, wherein at least one of the one or more derived attributes affects at least the product of the one or more products. The method can include transmitting to a content feed and a topology system the product identification for the product. The method also can include transmitting to the content feed the one or more derived attributes. The content feed can merge the at least one of the one or more derived attributes with the product information to update the product information in the content feed based on matching the product identification for the product with the one or more derived attributes. The product information can include the core product data, the product identification, and the at least one of the one or more derived attributes. The method can include receiving, by a receiver and from a rules engine, a new rule affecting the product. The method also can include searching, by the receiver, the content catalog for the product identification for the product that matches the new rule. The method can include determining, by the receiver, a first use case of one or more use cases based on an old rule minus the new rule. The method can include storing in the store database the first use case as part of the at least one of the one or more derived attributes associated with the product identification.

Although automatically determining a rule change event that can affect certain attributes of a product for display as expressed in a content catalog using a reactive attribute management platform has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 3-8 may include different procedures, processes, and/or activities and be performed by many different modules, in many different orders, and/or one or more of the procedures, processes, or activities of FIGS. 3-8 may include one or more of the procedures, processes, or activities of another different one of FIGS. 3-8. As another example, the systems within ecosystem 305, rules engine 360, content source 370, content feed 380, webserver 390 and/or content catalog 395. Additional details regarding ecosystem 305, rules engine 360, content source 370, content feed 380, webserver 390 and/or content catalog 395, (see FIGS. 3 and 6) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   an ecosystem comprising:
      one or more processors; and
      one or more non-transitory computer-readable media storing computing instructions configured to run on the one or more processors and perform:
         receiving, from a content source, product information for a product of one or more products, wherein the product information comprises (a) core product data for the product and (b) a product identification for the product;

storing, in a store database, one or more derived attributes of the one or more products, wherein the one or more derived attributes are based at least on a respective use case of one or more uses cases that affects the one or more products presented in a content catalog, and wherein at least one of the one or more derived attributes affects at least the product of the one or more products;

transmitting, to a content feed and a topology system, the product identification for the product;

transmitting, to the content feed, the one or more derived attributes;

merging, at the content feed, the at least one of the one or more derived attributes with the product information to update the product information in the content feed based on matching the product identification for the product with the one or more derived attributes such that the product information comprises the core product data, the product identification, and the at least one of the one or more derived attributes;

receiving, by a receiver and from a rules engine, a new rule affecting the product;

searching, by the receiver, the content catalog for the product identification for the product that matches the new rule;

determining, by the receiver, a first use case of one or more use cases based on an old rule minus the new rule; and storing, in the store database, the first use case as part of the at least one of the one or more derived attributes associated with the product identification.

2. The system of claim 1, wherein:
receiving, from the content source, the product information further comprises receiving the product information for the product from one or more third-party sources.

3. The system of claim 1, wherein:
storing, in the store database, the one or more derived attributes of the one or more products further comprises matching the one or more derived attributes with more than one of one or more product identifications of the one or more products;
the one or more product identifications are received from the content source; and
the one or more product identifications comprise the product identification.

4. The system of claim 1, wherein:
transmitting, to the content feed and the topology system, the product identification for the product further comprises transmitting, to the content feed and the topology system, the core product data for the product.

5. The system of claim 1, wherein:
after transmitting, to the content feed and the topology system, the product identification for the product, the computing instructions are further configured to run on the one or more processors and perform:
searching the store database, via the topology system, for the one or more derived attributes that match the product identification; and transmitting, to the content feed, the one or more derived attributes further comprises:
transmitting, to the content feed, the one or more derived attributes that match the product identification.

6. The system of claim 1, wherein:
storing, in the store database, the one or more derived attributes of the one or more products further comprises sending, from one or more topology domain systems to the store database for storage in the store database, the one or more derived attributes in reaction to a rule change event received by the receiver.

7. The system of claim 1, wherein:
searching, by the receiver, the content catalog further comprises using a search engine to search for one or more old rules associated with the new rule received by the rules engine, wherein the one or more old rules comprise the old rule;
the one or more old rules are associated with one or more product identifications of the one or more products in the content catalog; and
the one or more product identifications comprise the product identification.

8. The system of claim 1, wherein:
determining, by the receiver, the first use case of the one or more use cases based on the old rule minus the new rule further comprises assigning the first use case an expression weight to determine a number of product identifications for the one or more products impacted by the first use case; and
the product identifications comprise the product identification.

9. The system of claim 1, wherein:
the new rule affecting the product comprises a deletion of the old rule associated with the product identification for the product; and
the old rule is deleted from the at least one of the one or more derived attributes prior to the new rule being added to the product information for the product.

10. The system of claim 1, wherein:
when the product is a new product added to the content catalog:
an old rule does not exist for the product identification for the product; and
the first use case of the one or more use cases comprises the new rule.

11. A method being implemented via execution of computing instructions configured to run at one or more processors and stored at one or more non-transitory computer-readable media, the method comprising:
receiving, from a content source, product information for a product of one or more products, wherein the product information comprises (a) core product data for the product and (b) a product identification for the product;
storing, in a store database, one or more derived attributes of the one or more products, wherein the one or more derived attributes are based at least on a respective use case of one or more uses cases that affects the one or more products presented in a content catalog, and wherein at least one of the one or more derived attributes affects at least the product of the one or more products;
transmitting, to a content feed and a topology system, the product identification for the product;
transmitting, to the content feed, the one or more derived attributes;

merging, at the content feed, the at least one of the one or more derived attributes with the product information to update the product information in the content feed based on matching the product identification for the product with the one or more derived attributes such that the product information comprises the core product data, the product identification, and the at least one of the one or more derived attributes;

receiving, by a receiver and from a rules engine, a new rule affecting the product;

searching, by the receiver, the content catalog for the product identification for the product that matches the new rule;

determining, by the receiver, a first use case of one or more use cases based on an old rule minus the new rule; and storing, in the store database, the first use case as part of the at least one of the one or more derived attributes associated with the product identification.

12. The method of claim 11, wherein:

receiving, from the content source, the product information further comprises receiving the product information for the product from one or more third-party sources.

13. The method of claim 11, wherein:

storing, in the store database, the one or more derived attributes of the one or more products further comprises matching the one or more derived attributes with more than one of one or more product identifications of the one or more products; the one or more product identifications are received from the content source; and the one or more product identifications comprise the product identification.

14. The method of claim 11, wherein:

transmitting, to the content feed and the topology system, the product identification for the product further comprises transmitting, to the content feed and the topology system, the core product data for the product.

15. The method of claim 11, wherein after transmitting, to the content feed and to the topology system, the product identification for the product further comprises:

searching the store database, via the topology system, for the one or more derived attributes that match the product identification, and transmitting, to the content feed, the one or more derived attributes further comprises:

transmitting, to the content feed, the one or more derived attributes that match the product identification.

16. The method of claim 11, wherein:

storing, in the store database, the one or more derived attributes of the one or more products further comprises sending, from the one or more topology domain systems to the store database for storage in the store database, the one or more derived attributes in reaction to a rule change event received by the receiver.

17. The method of claim 11, wherein:

searching, by the receiver, the content catalog, further comprises using a search engine to search for one or more product identifications associated with the new rule received by the rules engine, wherein the one or more old rules comprise the old rule;

the one or more old rules are associated with one or more product identifications of the one or more products in the content catalog; and the one or more product identifications comprise the product identification.

18. The method of claim 11, wherein:

determining, by the receiver, the first use case of the one or more use cases based on the old rule minus the new rule further comprises assigning the first use case an expression weight to determine a number of product identifications for the one or more products impacted by the first use case; and the product identifications comprise the product identification.

19. The method of claim 11, wherein:

the new rule affecting the product comprises a deletion of the old rule associated with the product identification for the product; and the old rule is deleted from the at least one of the one or more derived attributes prior to the new rule being added to the product information for the product.

20. The method of claim 11, wherein:

when the product is a new product added to the content catalog:

an old rule does not exist for the product identification for the product; and the first use case of the one or more use cases comprises the new rule.

* * * * *